(12) United States Patent
Hutson et al.

(10) Patent No.: US 9,127,822 B2
(45) Date of Patent: Sep. 8, 2015

(54) AFOCAL OPTICAL CONCENTRATOR

(75) Inventors: John Hutson, Santa Clara, CA (US); William Ross McCluney, Chattanooga, TN (US)

(73) Assignee: SUNFLOWER CORPORATION, Boulder, CO (US)

( * ) Notice: Subject to any disclaimer, the term of this patent is extended or adjusted under 35 U.S.C. 154(b) by 737 days.

(21) Appl. No.: 12/575,724

(22) Filed: Oct. 8, 2009

(65) Prior Publication Data

US 2010/0091396 A1      Apr. 15, 2010

Related U.S. Application Data

(60) Provisional application No. 61/104,486, filed on Oct. 10, 2008.

(51) Int. Cl.
| | |
|---|---|
| G02B 5/10 | (2006.01) |
| G02B 17/06 | (2006.01) |
| G02B 27/30 | (2006.01) |
| F21S 11/00 | (2006.01) |
| F21V 7/00 | (2006.01) |
| F21V 7/04 | (2006.01) |
| F24J 2/10 | (2006.01) |
| F24J 2/14 | (2006.01) |
| F24J 2/18 | (2006.01) |

(52) U.S. Cl.
CPC ............. *F21S 11/00* (2013.01); *F21V 7/0008* (2013.01); *F21V 7/04* (2013.01); *G02B 5/10* (2013.01); *G02B 17/061* (2013.01); *G02B 17/0605* (2013.01); *G02B 27/30* (2013.01); *F24J 2/1047* (2013.01); *F24J 2/14* (2013.01); *F24J 2/18* (2013.01)

(58) Field of Classification Search
CPC ........ G02B 5/10; G02B 17/061; G02B 27/30; Y02E 10/45; F24J 2/1047; F24J 2/12; F24J 2/18
USPC ......... 359/366, 730, 731, 853, 858, 859, 852, 359/867, 641; 126/694, 693, 695
See application file for complete search history.

(56) References Cited

U.S. PATENT DOCUMENTS

| | | | |
|---|---|---|---|
| 3,392,277 A | 7/1968 | Dawson | |
| 3,414,904 A * | 12/1968 | Ajioka | ...................... 343/781 R |
| 3,511,559 A | 5/1970 | Foster | |
| 3,515,461 A * | 6/1970 | Rayces et al. | ................. 359/731 |

(Continued)

OTHER PUBLICATIONS

Abdul-Rahman et al., "Limitations in Current Day Lighting Related Solar Concentration Devices: A Critical Review", International Journal of the Physical Sciences, vol. 5(18), pp. 2730-2756, Dec. 29, 2010.

(Continued)

*Primary Examiner* — Ricky D Shafer
(74) *Attorney, Agent, or Firm* — Dorsey & Whitney LLP

(57) ABSTRACT

A Mersenne reflector system using parabolic troughs as primary and secondary reflectors, in Cassegrainian and Gregorian configurations, and a Mersenne-like reflector system using truncated parabolic troughs as primary and secondary reflectors in the Cassegrainian configuration, using a variety of combinations of reflector shapes: elliptical primary and circular secondary, rectangular primary and square secondary, elliptical primary and square secondary, and rectangular primary and circular secondary. A method for constructing truncated Cassegrainian systems using truncated troughs.

4 Claims, 34 Drawing Sheets

(56) References Cited

U.S. PATENT DOCUMENTS

Figure 1A:
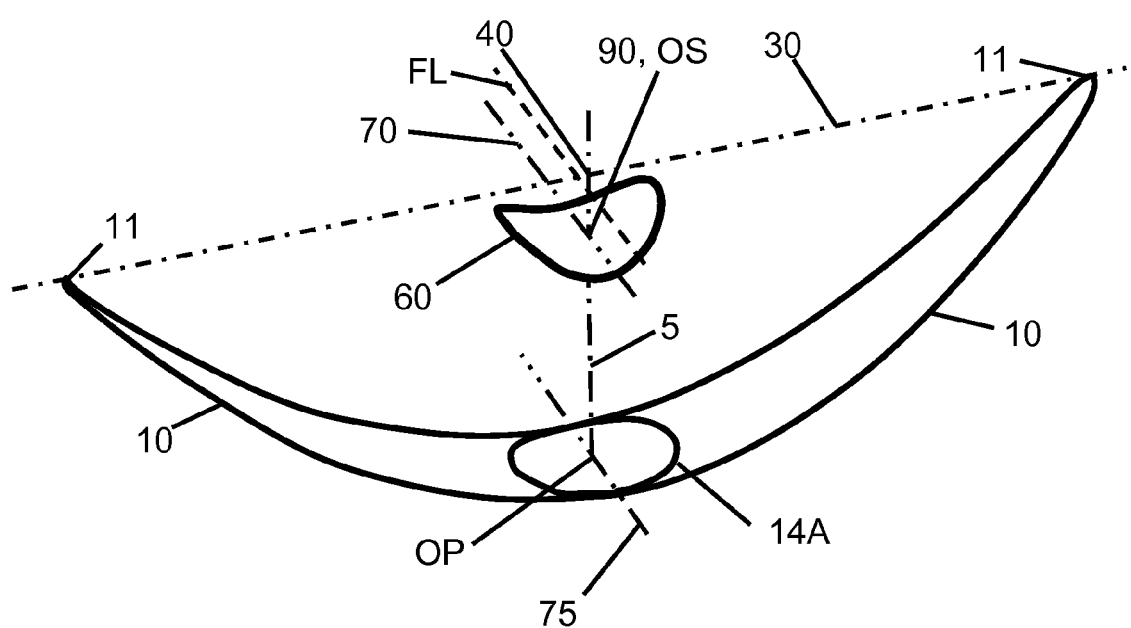

| | | | |
|---|---|---|---|
| 3,524,698 A * | 8/1970 | Brueggemann | 359/729 |
| 3,562,513 A | 2/1971 | Jaffe, Jr. | |
| 4,038,972 A * | 8/1977 | Orrison | 126/578 |
| 4,131,485 A * | 12/1978 | Meinel et al. | 136/259 |
| 4,149,523 A * | 4/1979 | Boy-Marcotte et al. | 126/589 |
| 4,286,581 A * | 9/1981 | Atkinson, Jr. | 126/585 |
| 4,297,000 A | 10/1981 | Fries | |
| 4,307,936 A * | 12/1981 | Ochiai | 385/120 |
| 4,372,027 A * | 2/1983 | Hutchison | 29/448 |
| 4,429,952 A | 2/1984 | Dominguez | |
| 4,528,977 A * | 7/1985 | Malley | 126/600 |
| 4,600,267 A | 7/1986 | Yamasaki et al. | |
| 4,611,575 A * | 9/1986 | Powell | 126/605 |
| 4,743,094 A * | 5/1988 | Mercado | 359/773 |
| 4,784,700 A * | 11/1988 | Stern et al. | 136/248 |
| 4,796,169 A | 1/1989 | Shemitz | |
| 5,365,367 A * | 11/1994 | Zehnpfennig et al. | 359/399 |
| 5,505,917 A * | 4/1996 | Collier, Jr. | 422/307 |
| 5,592,293 A * | 1/1997 | Garfinkle | 356/450 |
| 5,729,387 A | 3/1998 | Takahashi et al. | |
| 5,816,737 A | 10/1998 | Siblik | |
| 5,964,216 A * | 10/1999 | Hoffschmidt et al. | 126/696 |
| 6,118,579 A * | 9/2000 | Endemann | 359/366 |
| 6,128,135 A | 10/2000 | Stiles et al. | |
| 6,350,044 B1 | 2/2002 | Lea | |
| 6,667,831 B2 * | 12/2003 | Draganov et al. | 359/399 |
| 6,668,820 B2 * | 12/2003 | Cohen et al. | 126/685 |
| 2003/0169493 A1* | 9/2003 | Draganov et al. | 359/399 |
| 2005/0225885 A1* | 10/2005 | Wright | 359/871 |
| 2006/0150967 A1* | 7/2006 | Hoelle et al. | 126/694 |
| 2006/0231133 A1* | 10/2006 | Fork et al. | 136/246 |
| 2007/0159696 A1 | 7/2007 | Koizumi et al. | |
| 2010/0067114 A1 | 3/2010 | Kinney et al. | |

OTHER PUBLICATIONS

Duguay et al., "Lighting with Sunlight using Tracking Concentrators", Applied Optics, vol. 16(5), pp. 1444-1446, May 1977.

* cited by examiner

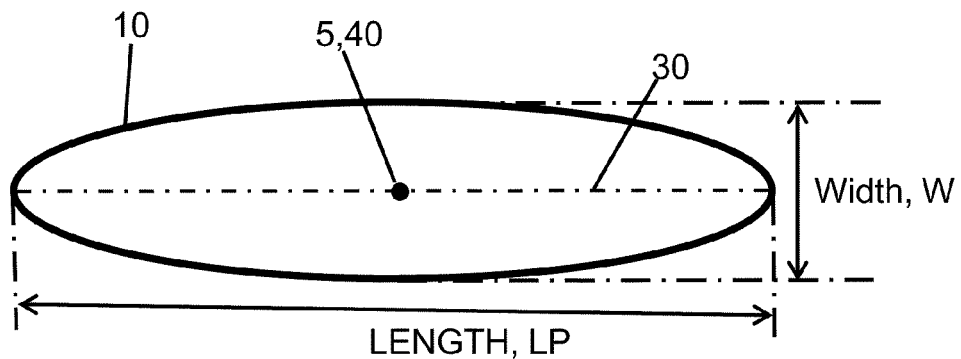
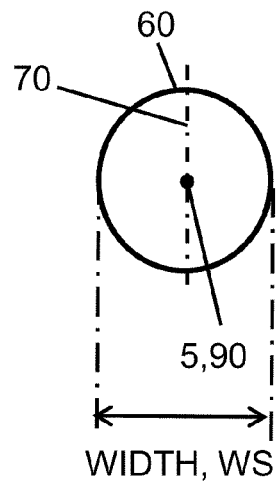
FIG. 1B
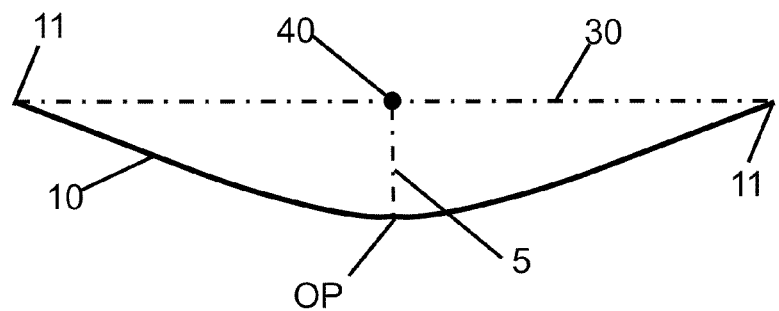

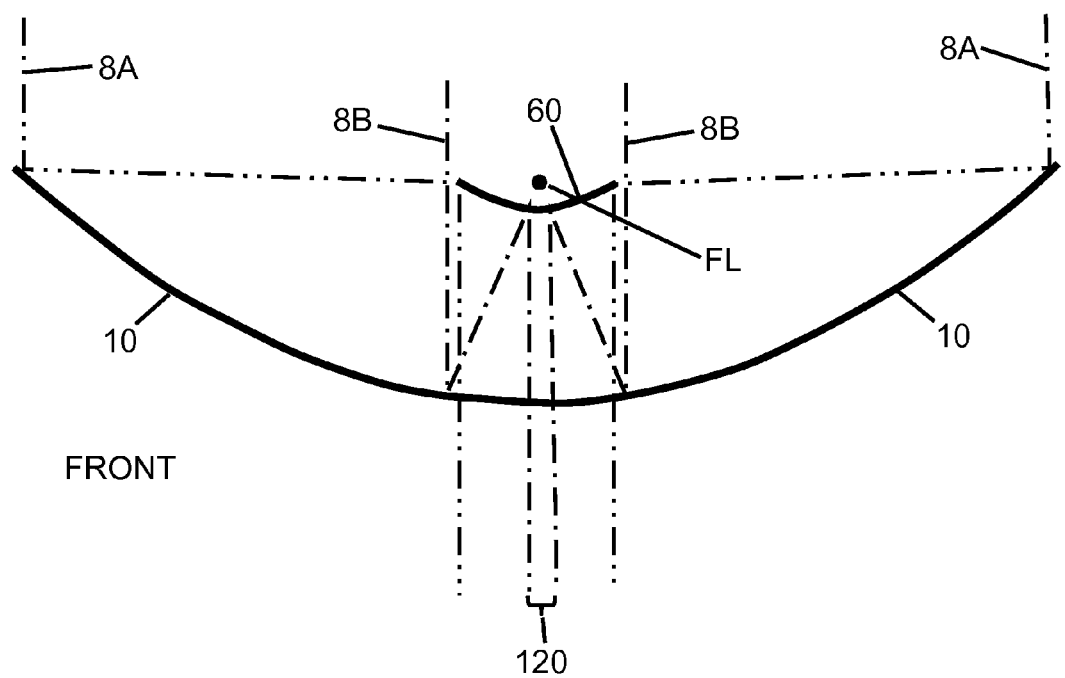

SIDE

TOP

SIDE

TOP

SIDE

TOP

SIDE

TOP

AFOCAL OPTICAL CONCENTRATOR

CROSS-REFERENCE TO RELATED APPLICATIONS

This is application claims the benefit of the file date of provisional application 61/104,486.

STATEMENTS REGARDING FEDERALLY SPONSORED RESEARCH AND DEVELOPMENT

Not applicable.

BACKGROUND

The present invention satisfies the need of constructing catoptric optical systems from sheets of reflective materials having low tensility.

Information relevant to attempts to address these problems can be found in U.S. Pat. Nos. 3,511,559; 4,429,952; 5,729,387; and 6,667,831; which are not admitted to be prior art with respect to the present invention by their mention in this Background Section. It is desirable to have better apparatuses and/or methods than what is disclosed in the identified references.

There is a class of reflective sheet materials that, although otherwise suitable for optical reflection systems, cannot be used to construct standard parabolic dish reflectors because they have low tensility: they cannot be pulled or stretched without causing mechanical stress leading to fracture. Alanod® is one such material. A sheet of Alanod® cannot be formed into a parabolic dish without causing mechanical stress leading to fracture, unless the dish is very shallow, which limits its utility for solar applications. These materials however are capable of simple bends, such as bending a sheet in one direction into a trough. Such a constraint motivates the question whether already known or classic dish-based optical systems with parallel output beams can be constructed from troughs instead. The present invention answers this question affirmatively. For want of a better term we say it is a "Mersenne-like" reflector system, with confocal parabolic optical surfaces, that replaces the usual Mersenne parabolic dishes with parabolic troughs but otherwise retains the Cassegrainian or Gregorian configuration of those optical elements (dishes, troughs). It is "Mersenne-like" rather than "Mersenne" because it uses troughs rather than dishes. It is useful for at least daylighting systems. In replacing the Mersenne parabolic dish design with a parabolic trough design, in order to maintain the same flux collection area with a fixed diameter emerging collimated beam, the trough is elongated in the curving direction, producing an elongated mirror with a longitudinal axis connecting the ends of the long direction of the mirror, these end points herein called "tips."

Reflector telescopes made from coaxial, confocal paraboloids were first described by Mersenne in the year 1636. Mersenne invented an afocal reflecting telescope that utilizes a larger perforated primary parabolic dish that reflects light onto a smaller secondary parabolic dish; the secondary then reflects light back through the perforation in the primary. In the Cassegrainian form of the Mersenne system the primary reflector is concave, the secondary reflector is convex, and the secondary is placed at a distance from the primary that is shorter than the focal length of the primary. In the Gregorian form of the Mersenne system the secondary reflector is also concave, but it is moved to a distance longer than the focal length of the primary. The confocal aspect of these systems makes them afocal: a parallel or collimated beam entering the system will be parallel or collimated leaving the system. As pointed out in U.S. Pat. No. 5,471,346, the configurations and relative positions of the primary and secondary reflectors or mirrors also determine obscuration ratios, f-numbers, and the overall focal length (or afocal magnification) of the system. These systems utilize concave primary and smaller convex secondary "paraboloids," or parabolas of revolution about an axis (herein called "dishes"). In fact, Mersenne reflectors strictly utilize parabolic dishes. Other reflector telescopes utilize other surfaces of revolution based on conic sections such as hyperbolas and circles, yielding hyperboloids and spheres, but they all utilize dishes.

The present invention is designed for concentrating direct-beam sunlight for general illumination and/or energy concentration uses, not for imaging, so the imaging constraints of the traditional Mersenne system are not needed. In some embodiments, the present invention truncates the parabolic troughs by splitting them through their centers and perpendicular to their longitudinal axes. Other inventions also truncate paraboloids, but what distinguishes some of the embodiments of the present invention is that they rejoin the parabolic troughs following truncation, resulting in a geometry that is no longer strictly parabolic but truncated: converted into two sections of a parabolic sheet. In the Cartesian coordinate system used herein, these three axes are perpendicular to each other: longitudinal, transverse, and optical.

SUMMARY

The embodiments of the present invention comprise a Mersenne reflector system using short parabolic troughs as primary and secondary reflectors and a Mersenne reflector system using truncated parabolic troughs as primary and secondary reflectors, in both Cassegrainian and Gregorian configurations. With troughs, the output beam of light is concentrated in only one axis, that is, along the length of the trough as measured along the longitudinal axis. Similarly to circularly symmetric dish-type systems, the output beam is collimated, composed of nominally parallel rays, whenever parallel rays are axially incident on the primary mirror. As such, the present invention has no imaging application. It is however adequate for daylighting systems and for solar cookers. It may also prove useful for laser and other nonimaging applications, or as a component of a specialized imaging system.

To construct the present invention one must do more than simply replace dishes with troughs. A circular beam of light leaving the secondary mirror is desired, because of its use in a tracking sunlighting system whereby the collimated beam emerging from the secondary reflector rotates over the course of a day and must pass through a circular aperture. To create a circular beam with minimal reflective material used, it is necessary for the secondary trough to have a circular profile as viewed from a distant point along the optical axis that projects through the center points, called the vertex OS of the secondary and the vertex OP of the primary, and for the primary trough to have a profile that is bounded by an ellipse as viewed from a distant point along the optical axis. That is, the parabolic trough, curved in one direction only, is bounded or cut by an elliptical cylinder (like a "cookie cutter") the cylinder axis being parallel to the optical axis of the trough. Stated another way, the projection of the perimeter of the parabolic trough onto a plane perpendicular to the optical axis is the reflector's profile, in the shape of an ellipse, as illustrated for the parabolic trough in the Cassegrainian configuration sketched in FIGS. 1A, 1B, 2A, 2B, and 2C. The dashed line 5 is the optical axis of the system, passing through the geometrical centers of the primary and secondary reflectors. In the preferred embodiment, the length of the primary mirror, LP, is approximately 160 inches. Its width, WP, is approximately 23 inches, which width is approximately the same as the diameter of the secondary mirror. To properly describe the primary reflector, the optical axis must be clearly defined. This is done by first assuming the parabolic trough to be continuous, without interior perforations, so that the center of the surface exists. We describe the elliptical profile parabolic trough primary more formally as follows: The primary reflector has an elongated perimeter, a geometric center, and a reflective surface. The surface has a parabolic shape in the elongated direction only. The perimeter is comprised of an infinite number of perimeter points and the geometric center of the reflector is a point in space whose distance from every point on the perimeter is minimized, or centered as follows: The sum of the squares of the distances from the geometric center to each of the perimeter points is the least possible value. Once this geometric center is established, the optical axis can be defined as the line passing through the geometric center that is perpendicular to the surface of the reflector where that line passes through the reflector surface. The vertex OP of the mirror is that point on the reflective surface of the mirror where the optical axis intersects that surface. This same approach is used to establish the optical axis of the secondary reflector, another parabolic trough reflector, and the constraint is added that the optical axes of these two reflectors must be coincident, i.e. one is an extension of the other. Cutting a hole in the center of the primary reflector to allow flux reflected by the secondary reflector to pass through is a separate operation. The profile of each reflector is defined to be the closed curve formed by projecting the perimeter of the reflector parallel to the optical axis onto a plane perpendicular to the optical axis. It is specified that the primary reflector has an elliptical profile and that the secondary reflector has a circular profile. From these definitions and specifications, the other characteristics of the optical system and its various embodiments can be described.

The primary reflector has a length LP as measured along its longitudinal axis having center point, where the longitudinal axis is the line perpendicular to the optical axis in the mirror's elongated direction. The longitudinal axis passes through the end or tip points of the perimeter of the reflector with a parabolic curvature in the longitudinal direction, which axis passes through the optical axis at the longitudinal axis center point 40. The primary reflector also has a vertex OP where the optical axis intersects the reflective surface and a plane of symmetry that includes the optical axis, slices the primary mirror transverse to its longitudinal axis, and also slices through the center of the secondary reflector. To economize on the size of the primary reflector, the width WP of the primary reflector, as measured through OP along the symmetry plane and perpendicular to the optical axis, should match the diameter of the secondary reflector. If the diameter of the secondary is less than the width of the primary, the primary will reflect light that does not fall on the secondary but that reflects around the outside of the secondary and into space. If the diameter of the secondary is greater than the width of the primary, excess material will have been used in the construction of the secondary, so it is best to match the width of the primary to the diameter of the secondary's profile. To increase the flux to the secondary, the primary is lengthened in the longitudinal direction. The width of the primary determines the width of the secondary and thus the diameter or width of the emerging collimated beam. The resulting beam of light reflected by the secondary possess a relatively uniform illuminance distribution whose flux is, in this embodiment, approximately five times the flux of direct beam sunlight incident on the primary mirror, five being the approximate net concentration ratio of the preferred embodiment of this invention. Other concentration ratios are possible and preferred for other applications. Net concentration ratio is defined below. This configuration however also results in an elliptical lacuna or central hole in the beam reflecting off of the secondary, which lacuna is caused by the shadow of the secondary reflector on the primary reflector, as modified by reflection from the primary and secondary.

A system with reflectors larger than what is defined above can be functional and may prove more economical. For instance, a system with a secondary trough configured with a simple rectangular or square profile, as viewed from a point along the optical axis and very far from the secondary reflector, and a primary trough configured as a rectangle or square will produce a rectangular or square output beam which can be used as is or from which a circular beam can be formed through the use of a delimiting aperture, which beam can have a diameter up to that of the length of the shortest side of the rectangular beam. This configuration will result in a rectangular lacuna in the beam reflecting off of the secondary. The beam emerging from this system can be square or, through the use of a beam-limiting aperture, circular, or any other shape formed by the aperture, so long as the aperture is wholly contained in the square beam reflected from the secondary reflector.

Figure 15A:
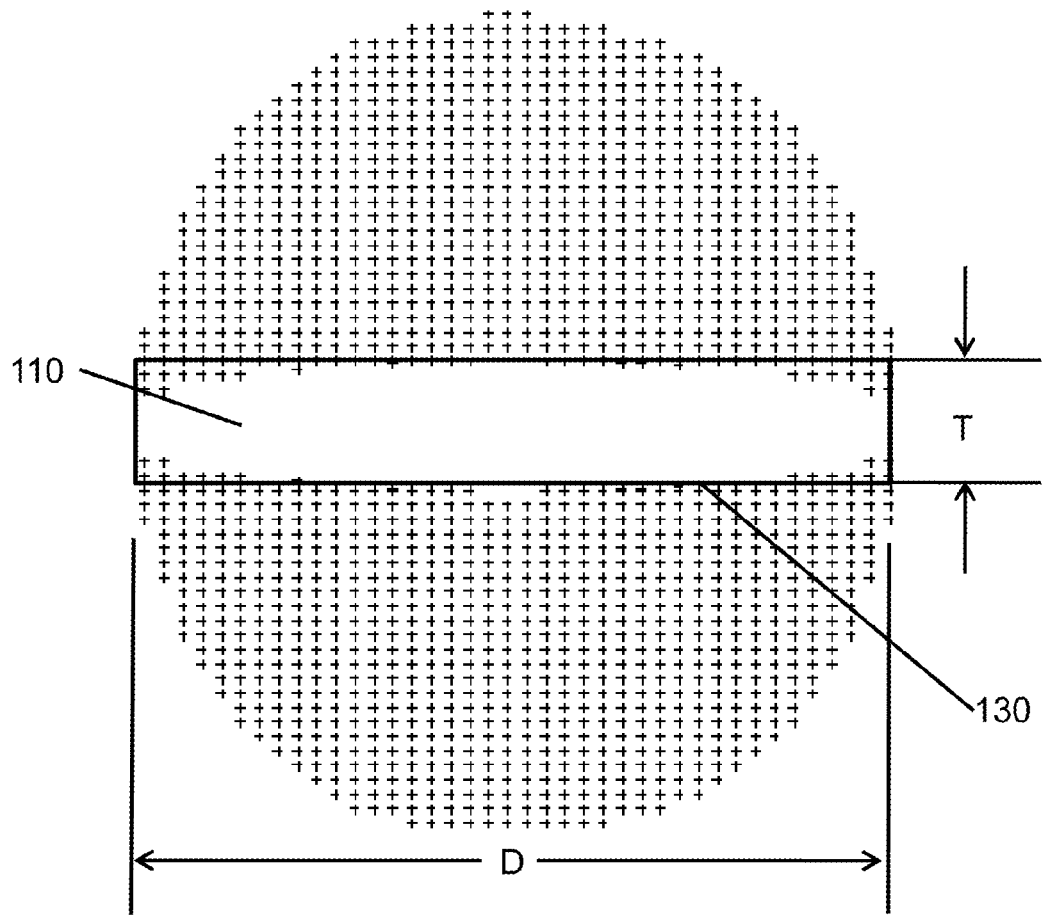
Figure 15B:
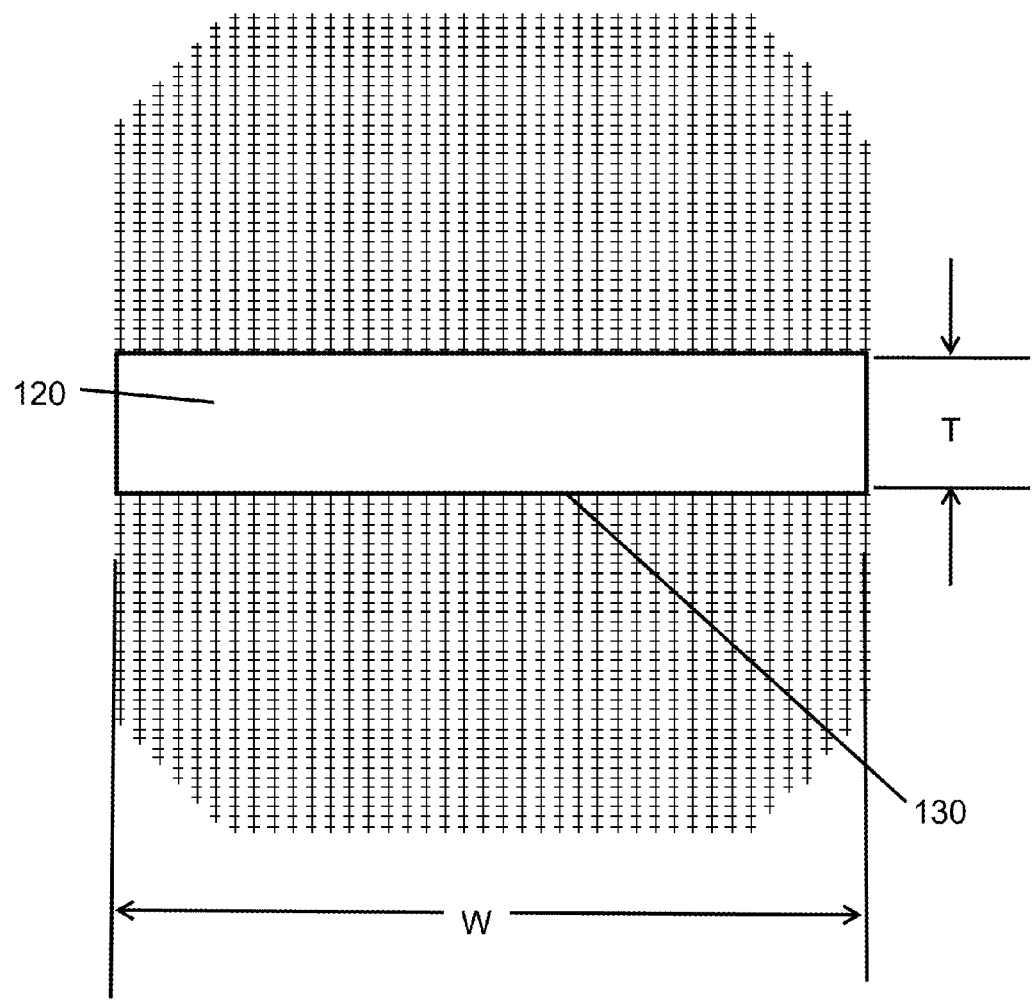
Figure 16:
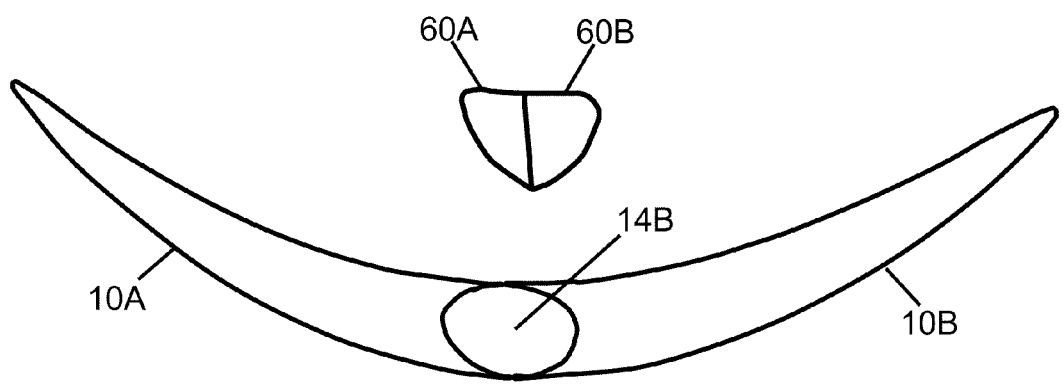

In a further nonobvious improvement over the original Mersenne system, the aforementioned elliptical or rectangular shadow-caused lacuna in the beam (110 in FIG. 13 or 120 in FIG. 14) may be eliminated as follows. As illustrated in the plots of FIG. 15A and FIG. 15B showing the positions of rays in a cross section of the beam reflected from the secondary reflector, the shape of the lacuna in the beam is approximated by a rectangle, whose longer dimension length W (or D) is equal to the width (or diameter, resp.) of the secondary, and whose shorter dimension of width T is equal to the width of the lacuna in the beam reflected from the secondary reflector. The secondary reflector is then split along its plane of symmetry, a rectangle of length D and width T/2 is removed from each side of the split secondary along its plane of symmetry, and the two halves are rejoined, thereby removing a section of length D and width T from the center of the secondary reflector. A similar operation is performed on the primary: the parabola is split along its plane of symmetry that includes the optical axis within it, a rectangle of length D and width T/2 is removed from each side of the split primary, and the two halves are rejoined, as illustrated in FIGS. 16 & 17. One may visualize the procedure as using a rectangular cookie cutter to cut out a rectangular section from the middle of the parabolic trough, centered on the center of the trough, and then the remaining cut halves are rejoined along the cut lines. The resulting beam of light reflecting off the secondary lacks the elliptical or rectangular lacuna or hole 110 or 120 in the center of the flux beam, as illustrated by the ray positions shown in FIG. 22. The resulting beam has a uniform flux density, but without the missing flux resulting from the hole or lacuna in the center of the beam. The shape of a cross-section through this modified beam is no longer a circle, but its perimeter is the shape of a circle with a central rectangular section removed and the two remaining parts joined together again, in which case some of the flux converging onto the secondary will be lost from the reflected beam due to the missing parts of the secondary which have been "trimmed" off to circularize the beam reflected from that mirror. The cross-section can be made circular by extending the parabolic curve of the secondary along the primary's longitudinal axis direction to ensure that the secondary has a circular shape when viewed from a distant point along the optical axis after the section of length D and width T is removed and extending the parabolic curve of the primary to fully illuminate the revised secondary. In the case of rectangular primary and square secondary reflectors, the shape of the emerging beam is rectangular with its width equal to that of the secondary reflector and the length equal to that of the secondary reflector. No flux is lost from the center of the primary-reflected beam in this case because the lacuna in that reflected beam is rectangular, matching in size and shape the sections cut from the two reflectors, even after their two halves are rejoined. The resulting beam is rectangular rather than square, unless primary and secondary reflectors are extended to compensate for the shortened direction.

Thus the present invention also comprises a method for constructing a truncated Mersenne reflector system using troughs without the lacuna in the reflected beam.

The sizing of the preferred embodiment is intended for providing daylight illumination to a somewhat distant light distribution system for illuminating a portion of the top floor, or the top few floors, of a building. The sizing of the preferred embodiment is determined through installation considerations and performance criteria. Many drop ceilings use 24"× 24" or 24"×48" grids, so the beam reflected off the secondary should be less than 24" in diameter to fit through one of the cells of such a grid. In the preferred embodiment, the present invention has a 23" diameter secondary reflector. To achieve a desired concentration ratio between four and six, the preferred length of the primary reflector is 160". Such system has a net concentration ratio of 5.9 for both elliptical and rectangular profile options but the rectangular option collects 27% more flux. An alternative embodiment has a primary reflector of length 140" and a secondary reflector of diameter 29". Such system has a net concentration ratio of 3.8.

The present invention exists in alternate embodiments, in both the Cassegrainian and Gregorian forms of the Mersenne system.

DRAWINGS

These and other features, aspects and advantages of the embodiments of the apparatus and/or methods will become better understood with reference to the following description, appended claims, and accompanying drawings where:

FIG. 1A shows a perspective view of the apparatus when realized in the Cassegrainian configuration with the secondary reflector having a circular profile and the primary reflector having an elliptical profile; FIG. 1B provides three conceptual drawings, informative schematics, to make clear the placement of the longitudinal axis 30 of a parabolic trough 10 having a perimeter which projects onto a plane perpendicular to the optical axis 5 into the shape of an ellipse, called the reflector's profile, in that plane. The vertex OP of that reflector lies along the optical axis 5 and within what is called herein a plane of symmetry. The latter includes within it the optical axis 5, the center 40 of the longitudinal axis, and transverse axes 70, 75 which are perpendicular to the longitudinal axis 30 of the primary reflector. The drawing of a circle in FIG. 1B is intended to represent the circular profile of a secondary reflector shaped as a parabolic trough. It shows the circular profile of that reflector and a transverse axis 70 of width WS or diameter through the center 90 or OS of that reflector with a center point which lies on the optical axis 5.

Figure 2A:
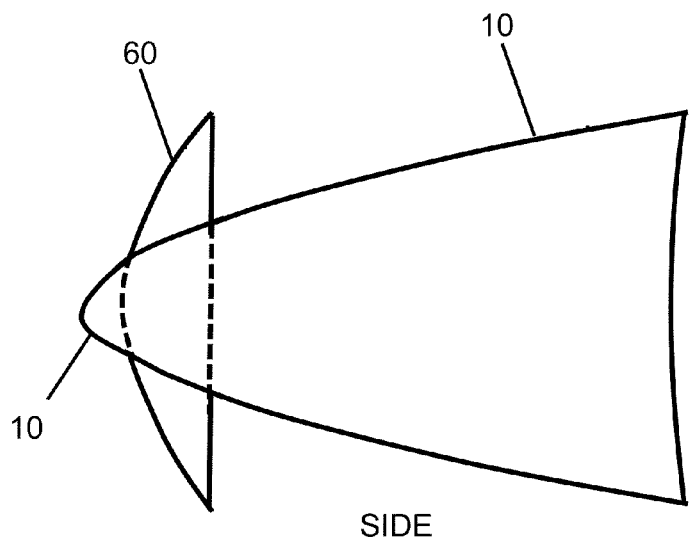
Figure 2B:
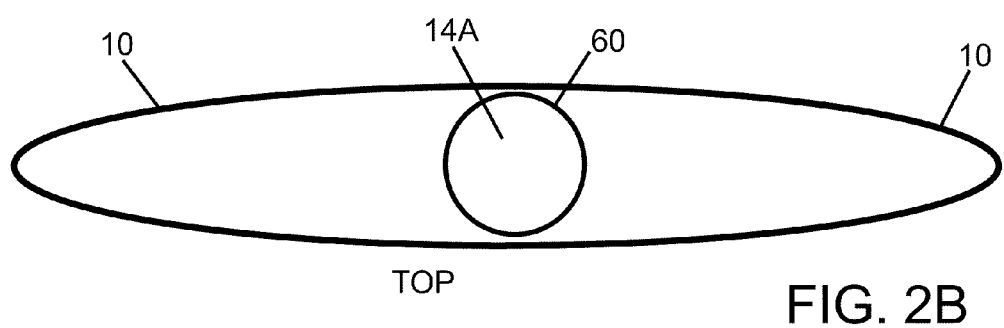
Figure 2C:
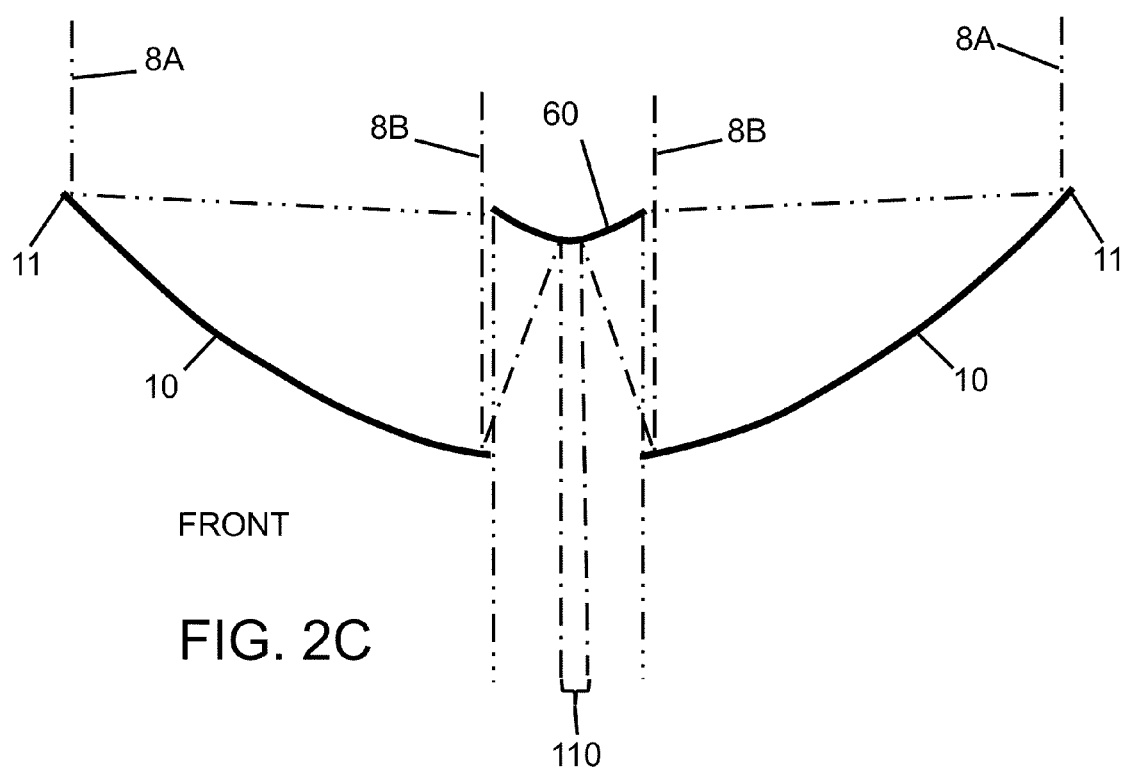

FIGS. 2A, 2B, and 2C show side, top, and front views, respectively, of the apparatus in the Cassegrainian configuration when realized with the secondary reflector having a circular profile and the primary reflector having an elliptical profile; The phantom lines in FIG. 2C are intended to represent the paths followed by incident rays 8A at the tips 11 of the primary reflector and central rays 8B just grazing the edge of the secondary reflector 60. Rays 8A are reflected by the primary reflector 10 near to the edge of the secondary reflector 60, which in turn reflects them down through the edge of the circular hole 14A cut in the center of the primary reflector. Rays 8B are reflected by the primary reflector 10 near to the center of the secondary reflector 60 and thence down through the hole 14A in the primary reflector. The shadow of the secondary reflector 60 has a certain width (110 in FIG. 2C) following reflection by the primary reflector back onto the secondary reflector and this gap 110 forms the lacuna (110 in FIG. 13) in the beam emerging downward in FIG. 2C from the apparatus described herein.

Figure 3:
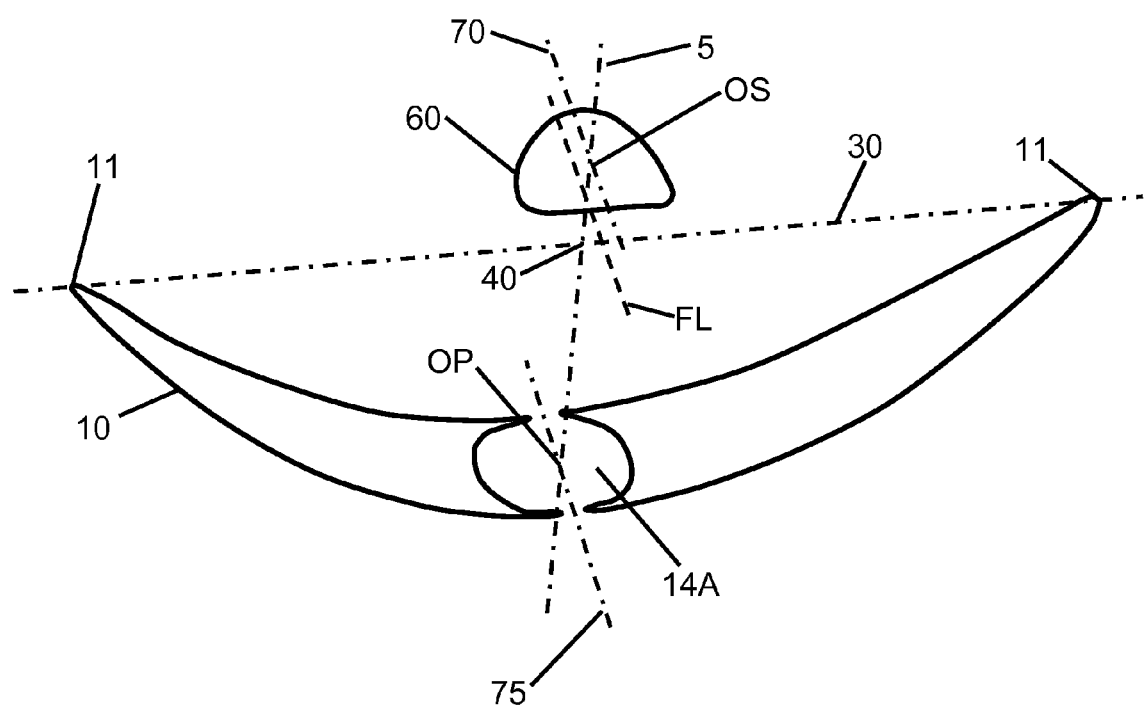
Figure 4A:
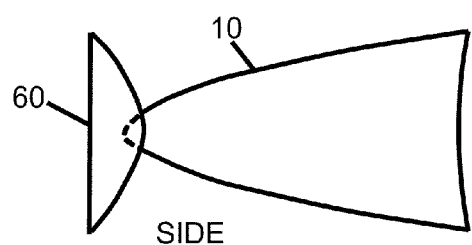
Figure 4B:
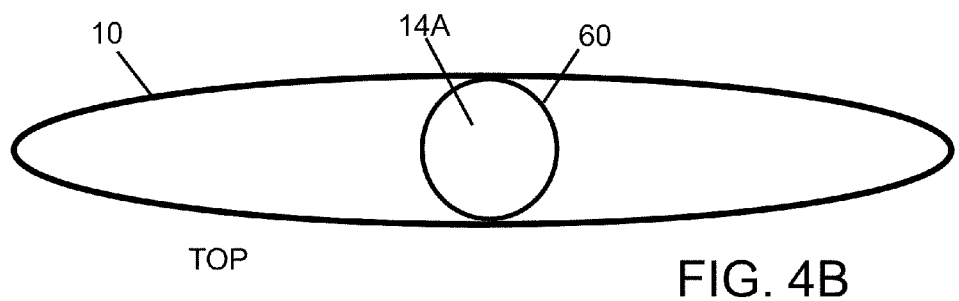
Figure 4C:
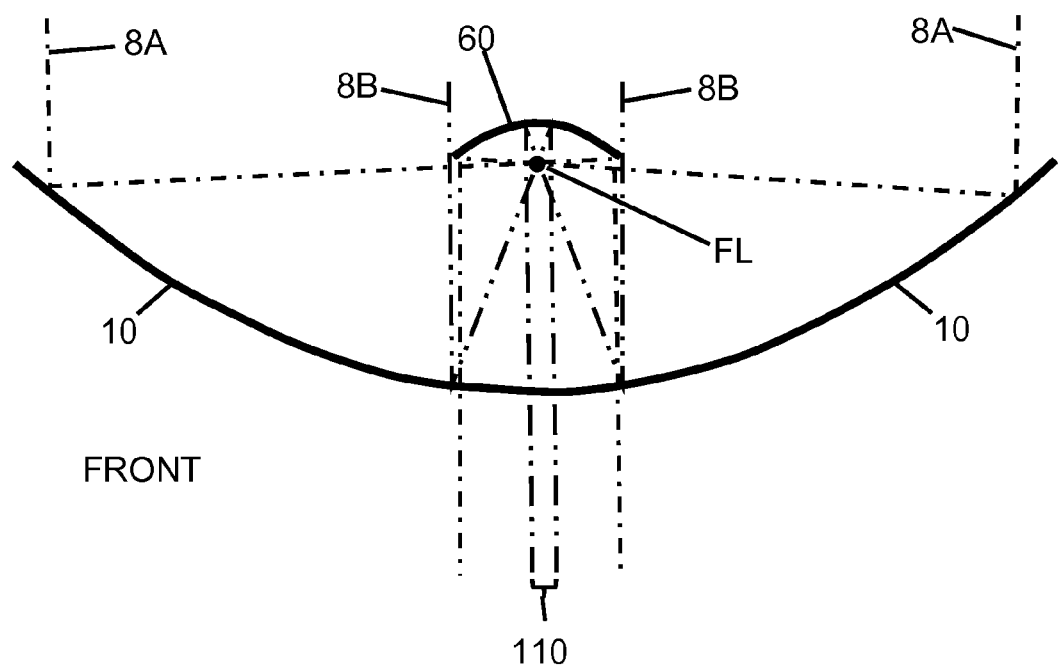
Figure 5:
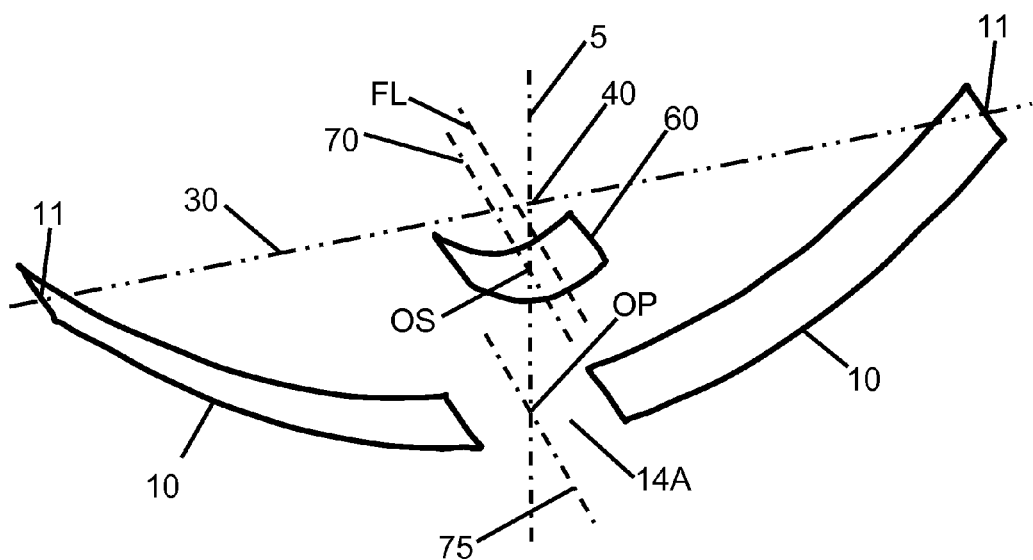
Figure 6A:
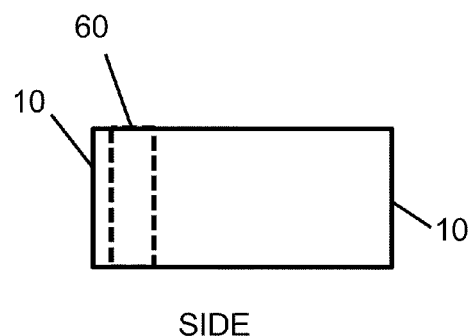
Figure 6B:
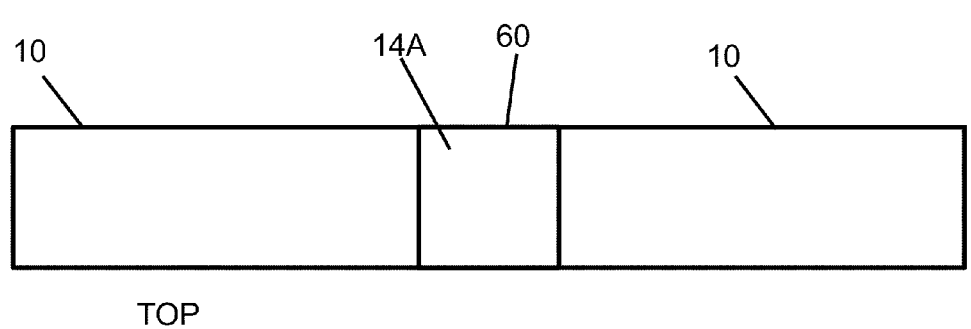
Figure 7:
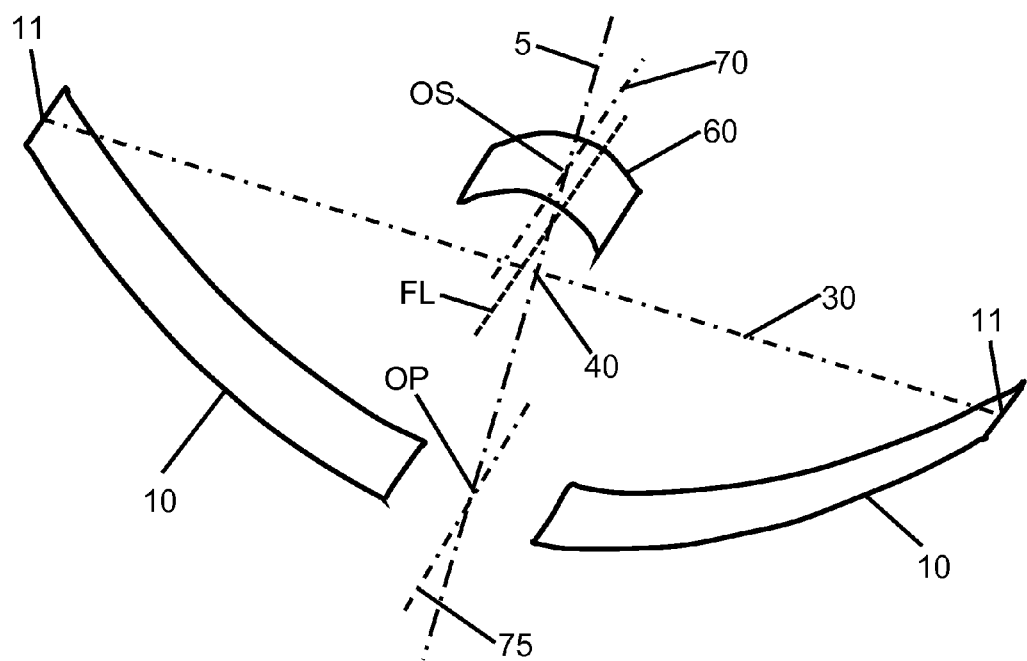
Figure 8A:
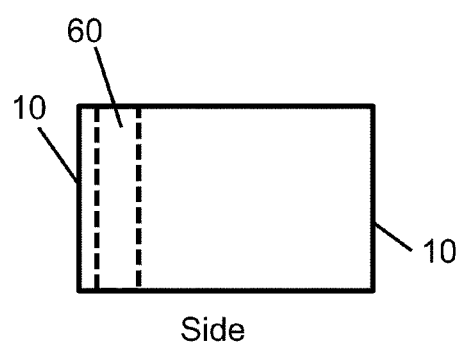
Figure 9:
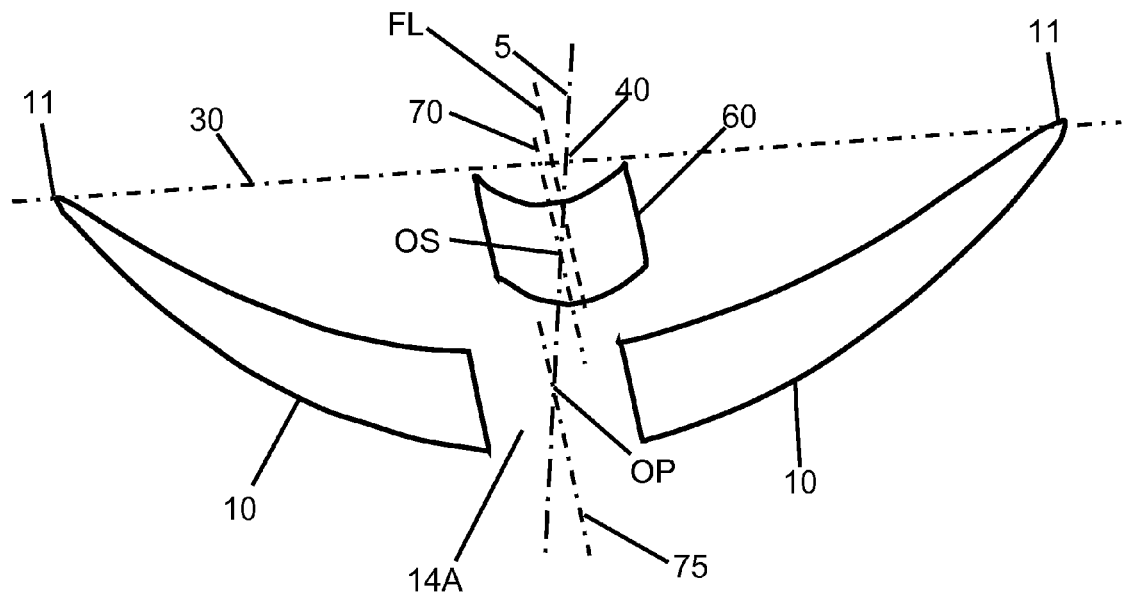
Figure 10A:
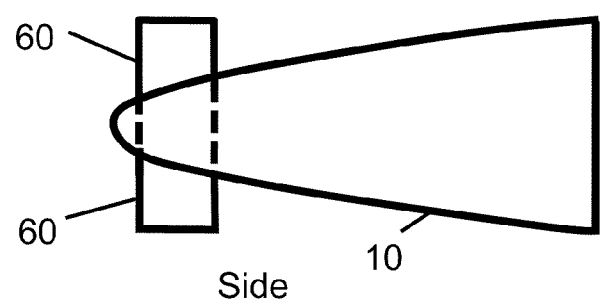
Figure 11:
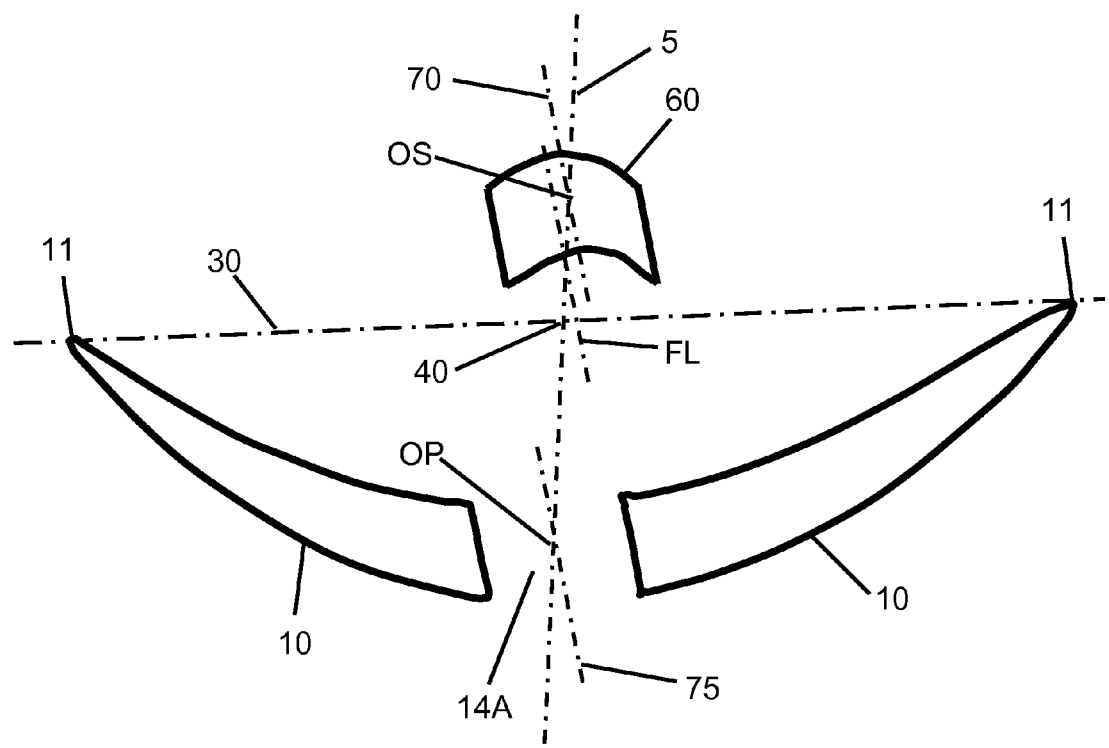
Figure 12A:
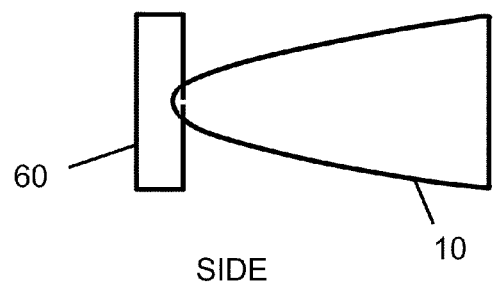
Figure 13:
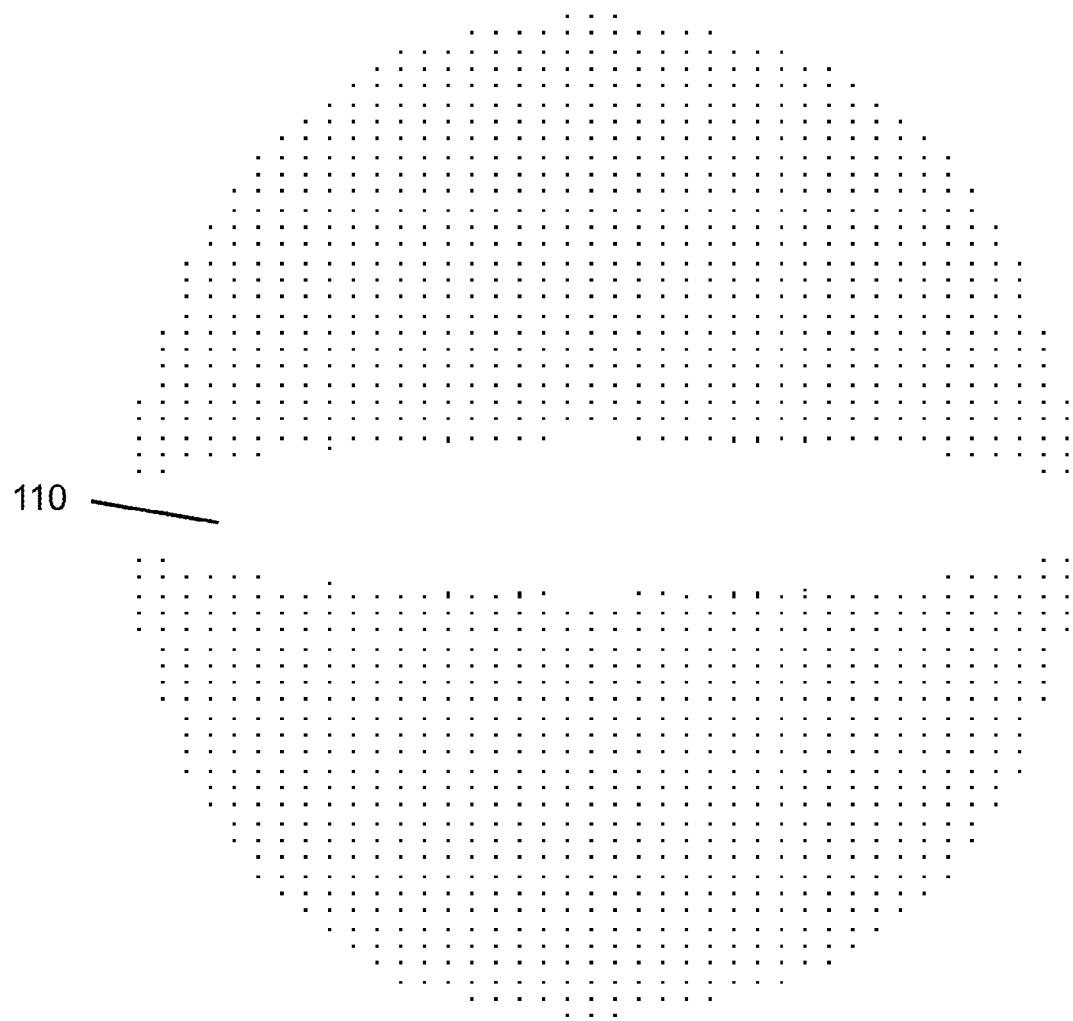
Figure 14:
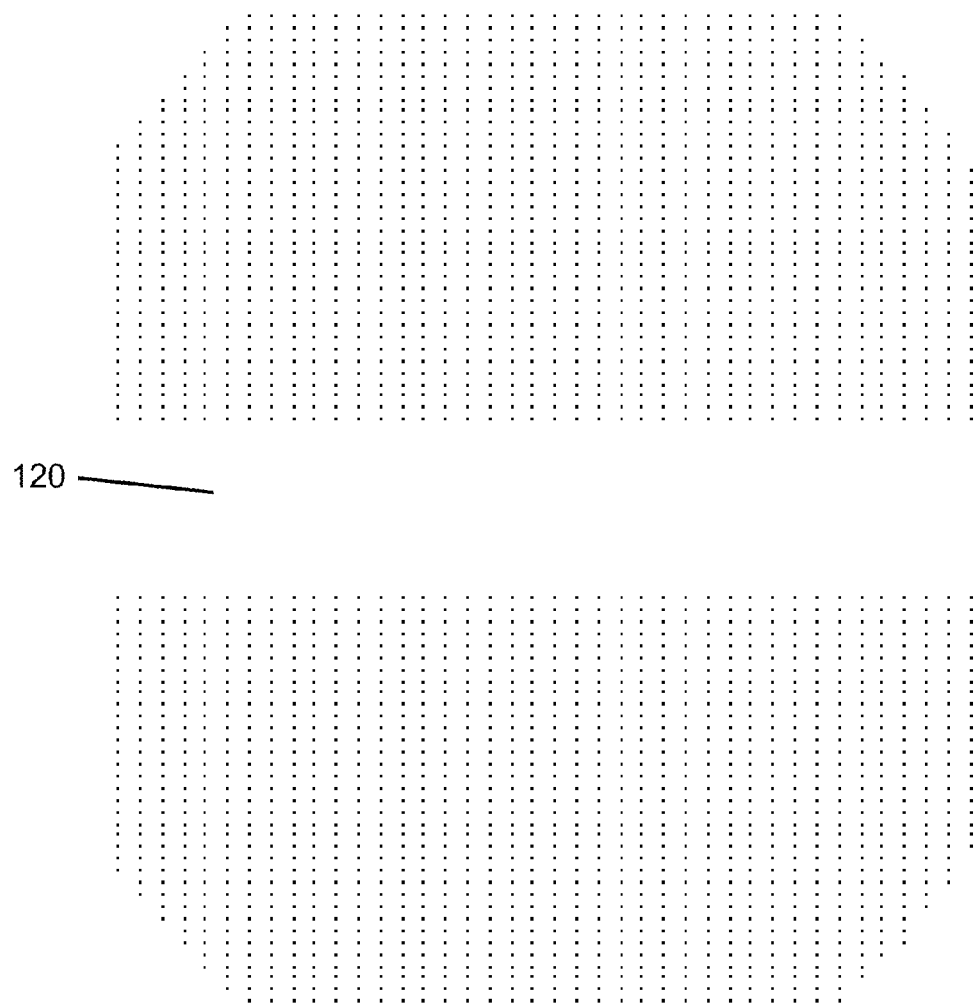
Figure 17A:
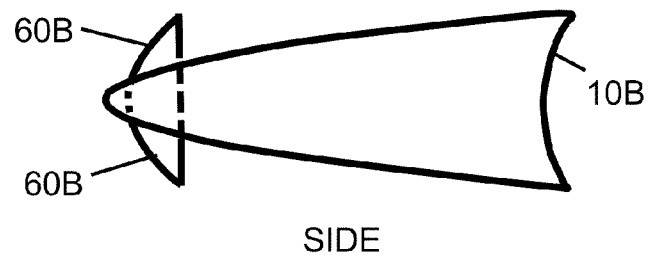
Figure 17B:
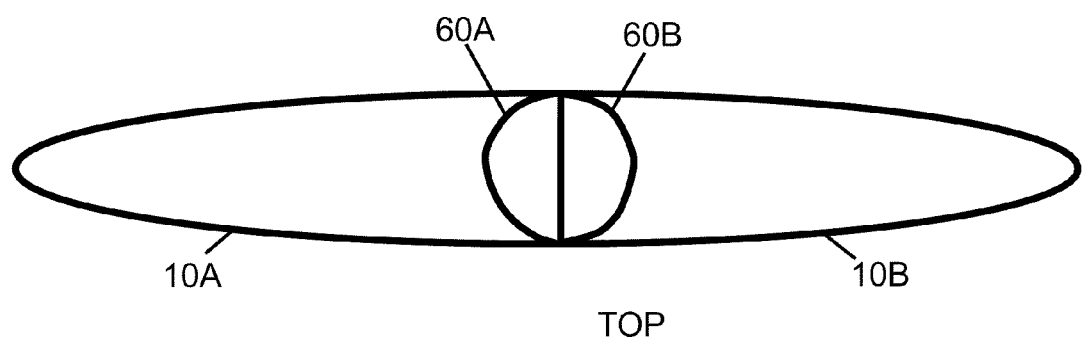
Figure 17C:
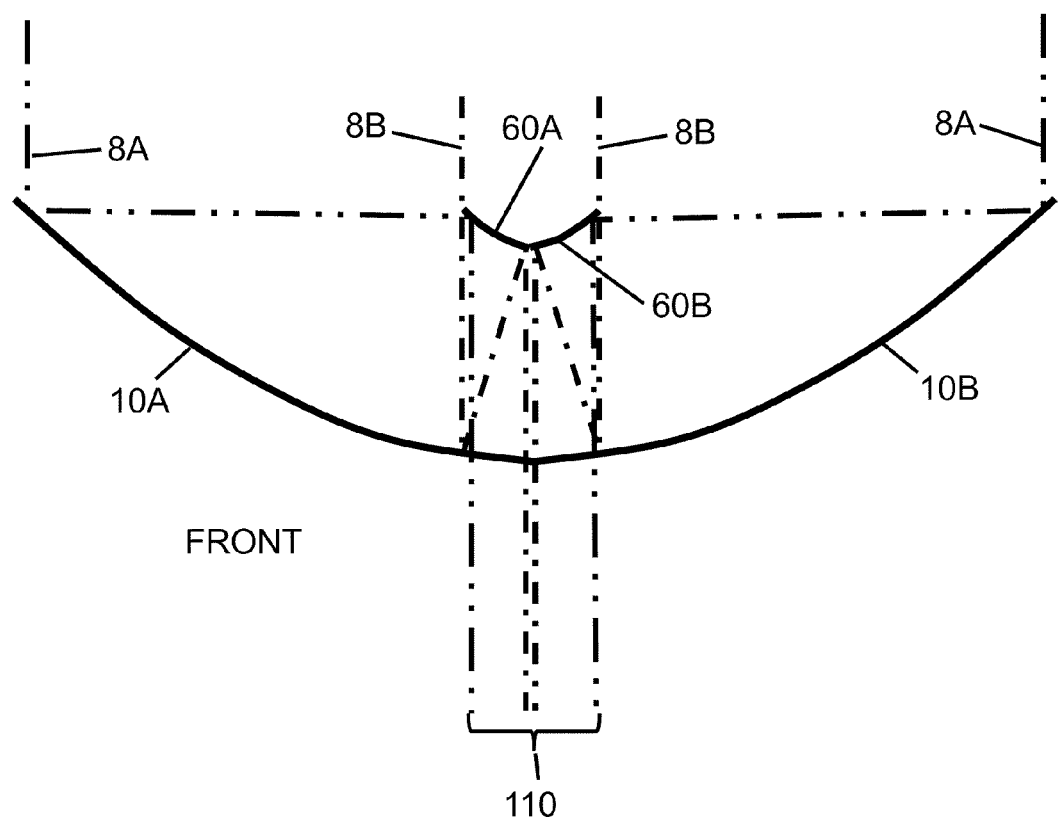
Figure 18:
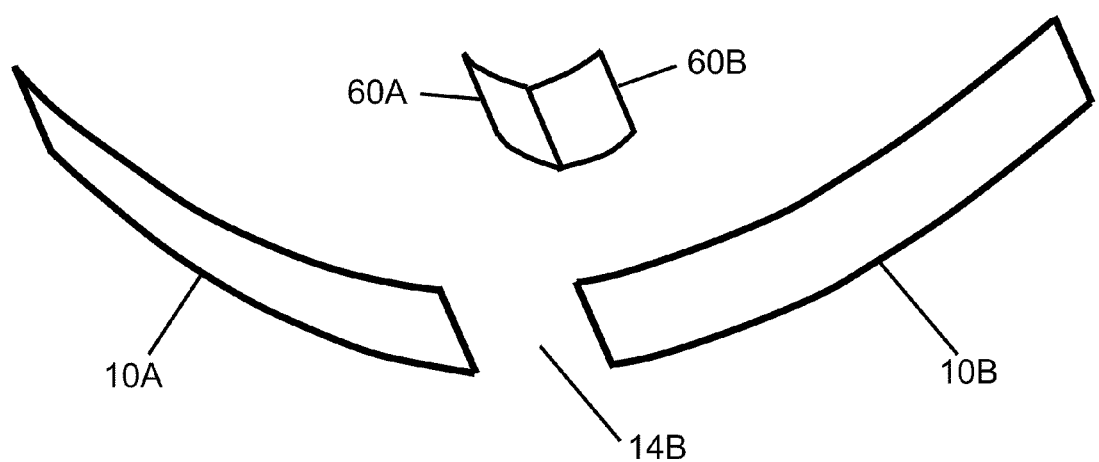
Figure 19A:
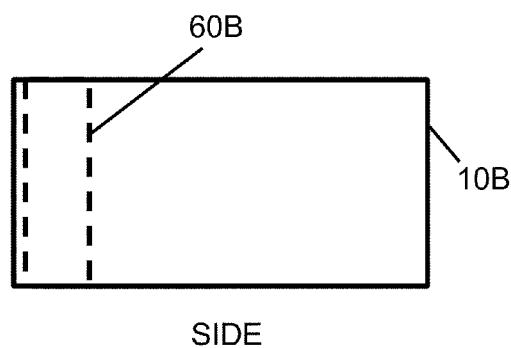
Figure 20:
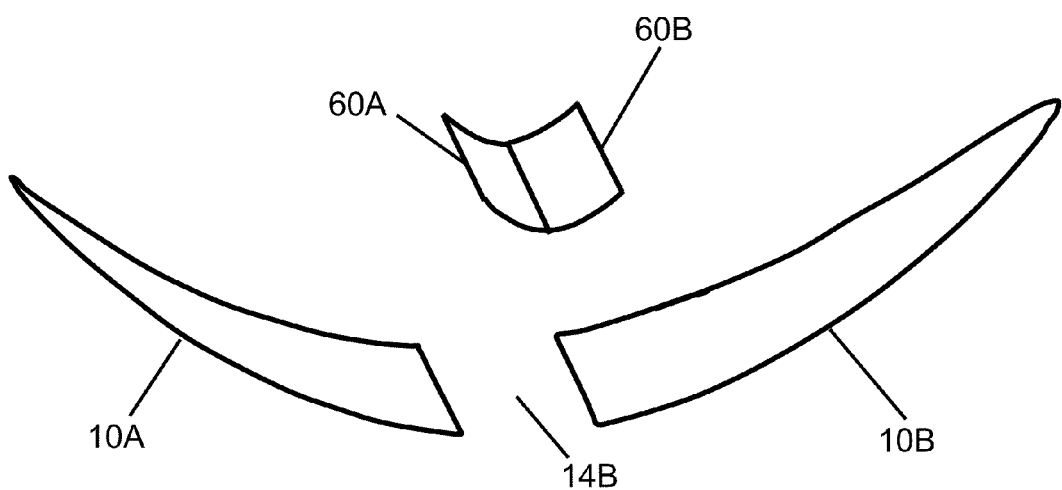
Figure 21A:
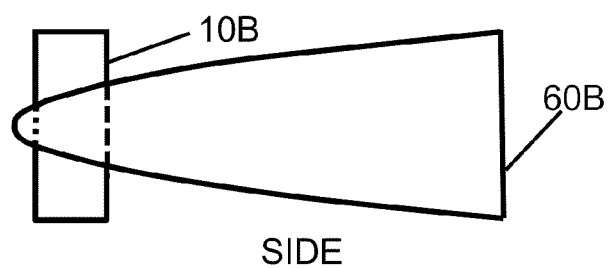
Figure 22:
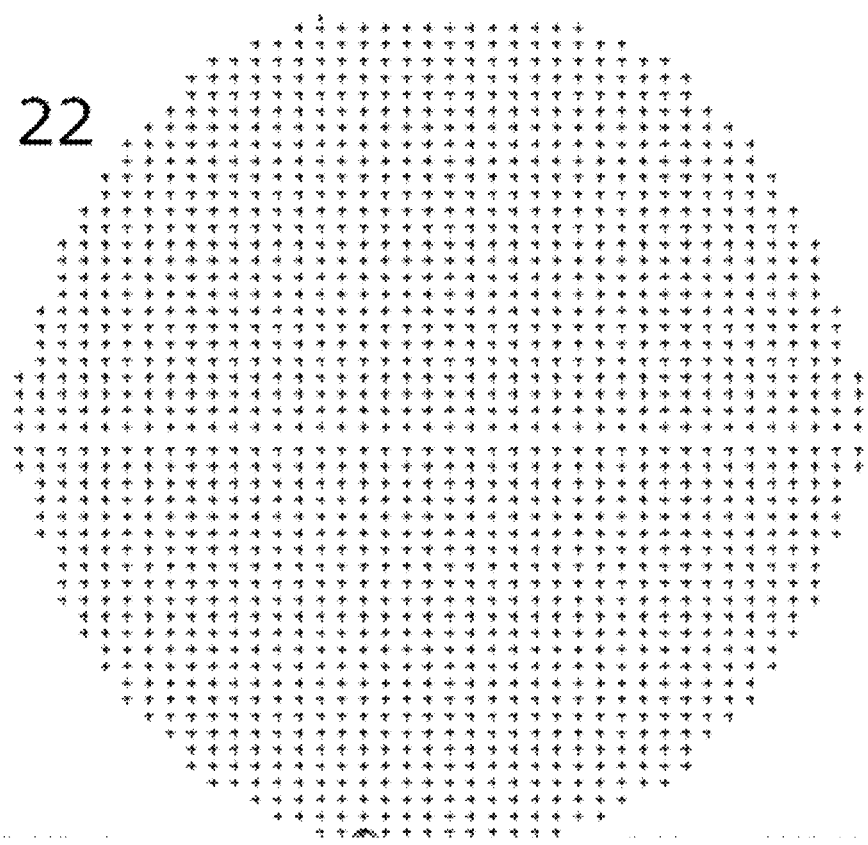

FIG. 3 shows a perspective view of the apparatus when realized with the secondary reflector being concave with a circular profile and the primary reflector having an elliptical profile, in the Gregorian configuration;

FIGS. 4A, B, and C show side, top, and front views, respectively, of the apparatus when realized with the secondary reflector having a circular profile and the primary reflector having an elliptical profile, in the Gregorian configuration;

FIG. 5 shows a perspective view of the apparatus in the Cassegrainian configuration when realized with the secondary reflector having a square profile and the primary reflector having a rectangular profile;

FIGS. 6A, B, and C show side, top, and front views, respectively, of the apparatus in the Cassegrainian configuration when realized with the secondary reflector having a square profile and the primary reflector having a rectangular profile;

FIG. 7 shows a perspective view of the apparatus in the Gregorian configuration when realized with the secondary reflector having a square profile and the primary reflector having a rectangular profile;

FIGS. 8A, B, and C show side, top, and front views of the apparatus in the Gregorian configuration when realized with the secondary reflector having a square profile and the primary reflector having a rectangular profile;

FIG. 9 shows a perspective view of the apparatus in the Cassegrainian configuration when realized with the secondary reflector having a square profile and the primary reflector having an elliptical profile;

FIGS. 10A, B, and C show side, top, and front views of the apparatus in the Cassegrainian configuration when realized with the secondary reflector having a square profile and the primary reflector having an elliptical profile;

FIG. 11 shows a perspective view of the apparatus in the Gregorian configuration when realized with the secondary reflector having a square profile and the primary reflector having an elliptical profile;

FIGS. 12A, B, and C show side, top, and front views of the apparatus in the Gregorian configuration when realized with the secondary reflector having a square profile and the primary reflector having an elliptical profile;

FIG. 13 shows a ray "spot" diagram from a computerized optical ray trace application for the apparatus in the configuration of FIGS. 3 and 4. The small dots or spots are the locations in a plane perpendicular to the optical axis 5 of rays leaving the secondary mirror, including the elliptical lacuna 110 in the beam reflected from the secondary reflector, caused by the shadow of the secondary reflector on the primary reflector;

FIG. 14 shows the rectangular lacuna 120 in the beam reflected from the secondary reflector caused by the shadow of the square secondary reflector on the primary reflector in the configuration of FIGS. 5 and 6;

FIGS. 15A and B show the rectangle 130 that approximates the elliptical 110 and rectangular 120 lacunas in the downwelling beam off the secondary for the same two configurations as FIGS. 3, 4, 5, and 6;

In FIGS. 15A and 15B the ray locations are indicated not with circular dots but with crosses or "plus" signs (+);

FIG. 16 shows a perspective view of the apparatus in the Cassegrainian configuration when realized with the truncated secondary reflector having a truncated circular profile and the truncated primary reflector having a truncated elliptical profile;

FIGS. 17A, B, and C show side, top, and front views, respectively, of the apparatus in the Cassegrainian configuration when realized with the truncated secondary reflector having a truncated circular profile and the truncated primary reflector having a truncated elliptical profile;

FIG. 18 shows a perspective view of the apparatus in the Cassegrainian configuration when realized with the truncated secondary reflector having a rectangular profile and the truncated primary reflector having a rectangular profile;

FIGS. 19A, B, and C show side, top, and front views, respectively, of the apparatus in the Cassegrainian configuration when realized with the truncated secondary reflector having a square profile and the truncated primary reflector having a rectangular profile;

FIG. 20 shows a perspective view of the apparatus in the Cassegrainian configuration when realized with the truncated secondary reflector having a square profile and the truncated primary reflector having an elliptical profile;

FIGS. 21A, B, and C show side, top, and front views of the apparatus in the Cassegrainian configuration when realized with the truncated secondary reflector having a rectangular profile and the truncated primary reflector having a truncated elliptical profile;

FIG. 22 shows the spot diagram (ray intersection locations) for the split trough configuration, indicating the relative uniformity in the geometrical distribution of rays across the emerging quasi-circular beam and the lack of a lacuna in that beam. This spot diagram shows a slight irregularity in the spacing of the rays across a horizontal line through the center of the beam resulting from the abrupt change in surface slope in the mirrors where the two truncated halves are rejoined. This figure can be contrasted with that of FIG. 13, showing a spot diagram for the unsplit, nontruncated Cassegrain system. It should be noted that the spot diagrams for FIGS. 13, 14, 15A, 15B, and 22 were generated by computerized optical tracing of rays through the system and that the incident beam was composed of a grid of perfectly parallel source rays, equally spaced in both left and right directions. Real beam solar radiation emanates from the solar disk having an angular diameter of approximately 0.5 degree. When randomly positioned source rays with this characteristic are sent through the apparatus described herein, beam spreading produces a partial filling in of the lacuna observed in the beam when only parallel rays are used with the unsplit trough configurations.

Figure 23:
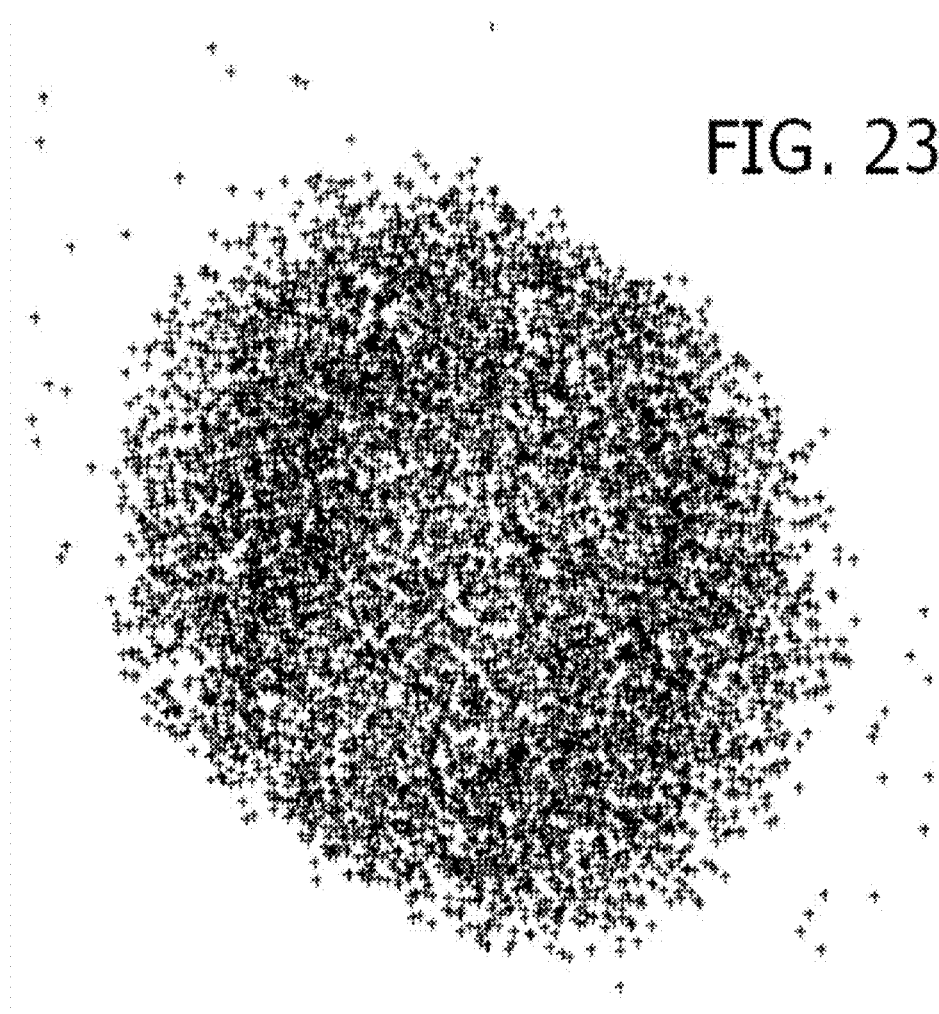

FIG. 23 shows a spot diagram similar to that shown in FIG. 13, but with a source beam of simulated solar radiation filling a 0.5 deg angular spread centered on the optical axis with random positioning of the rays in this source beam. The spreading of the solar rays fills in the lacuna well but with a slight lowering of the ray density diagonally across the center. This spreading produces a slightly non-circular perimeter to the rays and several outlier rays are also evident. The presence of these outliers is not matched by significant illuminance outside the main cluster of rays. In spite of the filling-in when a solar simulated ray source is used, there is still a lowered flux density in the region of the collimated grid source lacuna area, so using simulated source rays with this unsplit system only partially compensates for the lacuna clearly evident when a collimated beam of perfectly parallel source rays is used. For greater uniformity in the center of this beam, the truncated reflectors version can be used.

REFERENCE NUMBERS

5 Optical axis of the system; shown in phantom for clarity
8A Incoming rays from the source onto the longitudinal tips 11 of the primary reflector;
8B Incoming rays from the source onto the primary reflector, adjacent to the central hole cut in the primary reflector to allow rays from the secondary reflector to pass through
10 Untruncated primary reflector;
10A Left half of a truncated primary reflector; having a parabolic reflecting surface shape, inner rectangle removed;
10B Right half of a truncated primary reflector; having a parabolic reflecting surface shape, inner rectangle removed;
11 Tips or ends of the elongated parabolic primary reflector;
14A Hole in untruncated primary reflector 10 for admitting through it rays reflected from the secondary reflector, such hole of size and shape matching that of the untruncated secondary reflector 60;
14B Hole in truncated primary reflector for admitting through it rays reflected from the truncated secondary reflector, such hole of size and shape matching that of the joined truncated secondary reflector halves 60A and 60B
30 Longitudinal axis of primary reflector;
40 Center point of longitudinal axis of primary reflector
60 Untruncated round or square secondary reflector;
60A Left half of truncated secondary reflector; having a parabolic reflecting surface shape and circular or square edge shape, inner rectangle removed;
60B Right half of truncated secondary reflector; having a parabolic reflecting surface shape and circular or square edge shape, inner rectangle removed;
70 Bi-sector of secondary reflector, the transverse axis of the secondary; the plane of symmetry for the secondary is defined by this line and the optical axis 5.
75 Bi-sector of primary reflector, the transverse axis of the primary; the plane of symmetry for both the primary and the secondary is defined by parallel lines 70 and 75;
90 Center point of secondary reflector; also called the secondary mirror's vertex, OS
110 Elliptical lacuna in the beam reflected from the secondary, caused by the shadow of the circular profile secondary reflector on the primary reflector.
120 Rectangular lacuna in the beam reflected from the secondary, caused by the shadow of the square profile secondary reflector on the primary reflector;
130 Rectangle to be cut from the primary and secondary to eliminate shadows 110 and 120.

WRITTEN DESCRIPTION

Definitions

OP Vertex of primary reflector, the intersection of the primary reflector's transverse axis 75 and the optical axis 5; at the center of the imaginary extension of the parabolic shape of the primary mirror's reflective surface into the hole 14A in the center of the primary reflector
OS Vertex of secondary reflector, the intersection of the secondary reflector's transverse axis 70 and the optical axis 5

LP Length of the primary mirror; distance along the primary mirror's longitudinal axis between the points of intersection of the longitudinal axis with the perimeter of the reflector surface WP Width of the primary mirror's profile, equal to the width or diameter of the secondary mirror's profile WS Width of the secondary mirror's untruncated square profile, equal to its profile diameter when the profile is circular; this width defines the width or diameter of the reflected collimated beam D Diameter of the circular profile of the untruncated secondary mirror VS Distance between the vertices of the reflecting surfaces of the two mirrors; also known as the spacing of the mirrors.

C Concentration ratio, the ratio of flux emerging from the secondary reflector to the incident flux on the primary reflector.

Optical Axis A line through the center of a reflector which is also perpendicular to the reflector surface at the point where this line intersects the reflector surface.

Focal Line The line focus of a parabolic trough, being perpendicular to the optical axis and at the distance from the vertex of the parabolic trough equal to the parabolic trough's focal length.

Net concentration ratio is defined as the ratio of the effective entrance aperture area (the projection of the perimeter of the primary mirror onto a plane perpendicular to the mirror's optical axis, minus the area of the shadow of the secondary mirror) to the exit aperture area (the projection of the perimeter of the secondary mirror onto a plane perpendicular to the mirror's optical axis), multiplied by the product of the reflectances of the primary and secondary mirror optical surfaces. With this definition, the net concentration ratio is the ratio of the emerging flux to the incident flux on the primary reflector.

Let $\pi$ be pi (approximately 3.14159). Let $r_1$ be the half-length of the primary mirror (half of line segment 30 in FIG. 1B) and $r_2$ be the half-width of the primary mirror (equal to the radius of the secondary mirror and the radius of the emerging beam's circular cross section). The secondary mirror will have circular radius $r_2$. When projected onto a plane perpendicular to their axes, the two mirrors have profiles that are elliptical in shape. The area of the secondary mirror's circular (limiting case of an ellipse with equal semi-major and semi-minor axes) projection will be $\pi r_2^2$ and that of the primary mirror's projection will be $\pi r_1 r_2$, since the width of the primary mirror matches the diameter of the secondary mirror. Thus the effective entrance aperture area of the system will be $\pi(r_1 r_2 - r_2^2)$ and the effective exit aperture area will be $\pi r_2^2$. The ratio of these is the flux concentration ratio: $C=(r_1-r_2)/r_2$.

Emerging irradiance is the flux density in power per unit area (Watts/m$^2$) in a plane intersecting the radiant beam reflected from the secondary and perpendicular to the optical axis.

The profile of a reflector is defined as a projection of the perimeter of the reflector onto a plane perpendicular to the optical axis.

The Cassegrainian design or configuration has many variations: parabolic primary mirror and a hyperbolic secondary mirror ("Classic"), two hyperbolic mirrors (Ritchey-Chretien), concave elliptical primary and convex spherical secondary (Dall-Kirkham), off-axis configurations such as the Schiefspiegler, a parabolic primary altered (ground) to correct the spherical aberration (Schmidt-Cassegrain), a spherical primary mirror and a spherical secondary (Maksutov-Cassegrain), and a spherical primary and spherical secondary wherein the classical Cassegrain secondary mirror is replaced by three air spaced lens elements (Argunov-Cassegrain). The embodiments of the present invention use combinations of parabolic and truncated parabolic troughs, with concave primaries and either convex or concave secondaries, and therefore differ from all of the above other optical systems.

Regarding the dimensions of the primary trough, we adhere to the standard convention calling the narrow side the width and the longer side the length. However, the usual length of a more typical trough by standard convention is in the direction of the focal line, since in most trough reflectors used for solar energy applications, the reflector is longer in the focal line direction than perpendicular to it. To be clear, in the embodiments of the present invention, the trough is shorter in the direction of the focal line than in the perpendicular direction, so we reverse that terminology to call the longest dimension of the primary mirror the length.

The plane of symmetry is a plane containing the optical axis of the system and the transverse axis of both the primary and secondary reflectors.

In computer aided design, the surface boundaries of three dimensional objects are often created by starting with a line segment or section of a curve in a plane in space and then sweeping that curve in some way along another defined curve, to create the three dimensional surface desired. In optical design, this approach is used to create two common surface shapes: sections of a sphere and sections of a paraboloid, a parabola of revolution. In the latter case, a portion of a parabolic curve is created in a plane and rotated around the axis of the parabola to create a three-dimensional bowl or dish-shaped surface. Primary mirrors used in telescopes commonly use reflective parabolic dishes described mathematically (or generated in computer aided design) in this way. The original parabola can be thought of as the generating curve while the axis of revolution becomes the optical axis. The advantage of a parabolic dish is that rays from an infinitely distant point source on the optical axis of the dish are brought to a point focus on the optical axis of the mirror. In solar energy applications, it is sometimes desired to bring the rays from a distant point source to a line focus. This can be achieved using a reflector in the shape of a parabolic trough. The shape of this three-dimensional surface is created in computer-aided design not by rotating a planar parabolic curve about an axis but by sweeping the parabolic curve in a linear direction perpendicular to the plane of the parabola. This produces a trough-shaped reflector possessing a focus in the shape of a line segment parallel to the direction of the sweeping movement. The optical axis of the trough is defined similarly to that for the parabolic dish. It is a line through the center of the trough, perpendicular to both the trough's line focus and its transverse axis and passing through the center of the line focus.

Confocal: having the same focus or foci. Afocal: An optical system of zero convergent power, for example, a telescope; describing an optical system in which an image is transferred without bringing it to a focus. To achieve the confocal requirement, the focal lines of the primary and secondary troughs are made to be coincident. For the Cassegrainian configuration, the primary reflector's focal line is located behind the secondary reflector, a distance FP from the primary reflector's convex vertex (the intersection of the reflector surface with its optical axis), where FP is the focal length of the primary reflector. Since the secondary reflector has a convex shape, it is a negative mirror and its focal line is also behind this reflector, at a distance FS from its vertex (the intersection of the reflector surface with its optical axis). To achieve the Mersenne confocal condition, therefore, the axial distance between the vertices of these two mirrors is equal to VS=FP−FS. The selection of values for FP and FS is made to satisfy design requirements. The total area of the primary mirror's entrance aperture (less the area of the hole in its center) determines the quantity of solar flux collected by the system. The width of the primary mirror is dictated by and is equal to the desired width or diameter of the emerging collimated beam, which in turn may be dictated by the dimensional constraints of the installation, such as whether the beam of flux will fit between standard roof truss or joist spacings in typical nonresidential buildings. The length of the primary mirror is dictated by how much flux it is desired to capture by the system. Once the length of the primary has been decided, its focal length and that of the secondary reflector (including therefore its spacing from the primary) may be determined by the following considerations. A short focal length may be desired in order to keep the optical system as compact as possible for the dimensions previously selected, but this can produce two undesired consequences. The first is that short focal lengths increase the curvatures of both mirrors, possibly producing fabrication difficulties or higher costs. The second is that a short focus primary will draw the secondary closer to it, even inside the curvature of the primary reflector, meaning that rays reflected from the primary's outer limits, near its tips, can be incident on the side of the secondary reflector, thereby missing the reflective front of that reflector and being lost from the collimated emerging beam. Since this flux converging onto the secondary reflector is concentrated, absorption of a significant portion of that flux by the sides or back of the secondary reflector can produce overheating. There are two possible corrections to this difficulty. First is to make the secondary reflector rectangular or elliptical, elongating it parallel to the primary reflector's longitudinal axis, thereby extending the reflecting surface of the secondary outward and upward or away from the primary, but still following the parabolic shape required of the secondary, thereby intercepting rays from the primary incident at large angles from the optical axis. Unfortunately, this approach, though a perfectly valid embodiment of it, has the disadvantage of elongating the collimated beam reflected from the secondary, an effect to be avoided in most applications of this design. Second is to lengthen the focal lengths of the two mirrors. The optimum design is one that provides an acceptable compromise between the need for compactness (to save on weight and material costs) and the need to avoid the two problems resulting from short focal length designs. Once the focal lengths of the two reflectors have been set, the spacing of the mirrors will be the difference between their two values (or their sum if the secondary's focal length is expressed as a negative number). For the Gregorian configuration, the confocal requirement remains the same, that the focal lines of the two reflectors be coincident. With the secondary reflector being concave in this configuration, however, its focal length will be positive and the spacing VS of the two mirrors will be the sum of the reflector focal lengths, VS=FP+FS. If the focal lengths are made too short in this Gregorian configuration, the rays reflected from the outer portions of the primary reflector, following their propagation toward, through, and beyond the primary's focal line, may miss the secondary reflector and be lost from the optical system. Thus, the primary focal length must be long enough to avoid this problem. The specific distance between the two reflectors in any given case will be a matter of trial-and-error provided that the result is afocal parallel light, and that the structure of the system is Casegrainian or Gregorian.

As shown in Tables 1 and 2, several embodiments of the apparatus are disclosed and claimed.

TABLE 1

| Figures | Primary reflector | Secondary reflector | Configuration |
| --- | --- | --- | --- |
| 1A - perspective | Elliptical | Circular | Cassegrainian |
| 1B - reflector definitions | Elliptical | Circular | Cassegrainian |
| A - side, 2B - top, & 2C - front | Elliptical | Circular | Cassegrainian |
| 3 - perspective | Elliptical | Circular | Gregorian |
| 4A - side, 4B - top, & 4C - front | Elliptical | Circular | Gregorian |
| 5 - perspective | Rectangular | Square | Cassegrainian |
| 6A - side, 6B - top, & 6C - front | Rectangular | Square | Cassegrainian |
| 7 - perspective | Rectangular | Square | Gregorian |
| 8A - side, 8B -top, & 8C - front | Rectangular | Square | Gregorian |
| 9 - perspective | Elliptical | Square | Cassegrainian |
| 10A - side, 10B - top, & 10C - front | Elliptical | Square | Cassegrainian |
| 11 - perspective | Elliptical | Square | Gregorian |
| 12A - side, 12B - top, & 12C - front | Elliptical | Square | Gregorian |

TABLE 2

| Figures | Primary reflector | Secondary reflector | Configuration |
| --- | --- | --- | --- |
| 16 - perspective | Truncated Elliptical | Truncated Circular | Cassegrainian |
| 17A side, 17B - top, & 17C - front | Truncated Elliptical | Truncated Circular | Cassegrainian |
| 18 - perspective | Truncated Rectangular | Truncated Square | Cassegrainian |
| 19A - side, 19B -top, & 19C - front | Truncated Rectangular | Truncated Square | Cassegrainian |
| 20 - perspective | Truncated Elliptical | Truncated Square | Cassegrainian |
| 21A - side, 21B - top, & 21C - front | Truncated Elliptical | Truncated Square | Cassegrainian |

Preferred Embodiment

The Secondary Reflector Having a Circular Profile and the Primary Reflector Having an Elliptical Profile, in the Cassegrainian Configuration [FIGS. 1 & 2, Claims 1-4]

As shown in FIGS. 1 and 2, the preferred embodiment of the present invention is an optical concentration and collimation system, comprising:

A. a concave parabolic trough as a primary reflector 10, the primary reflector 10 having a perimeter and a surface with a center, the primary reflector 10 having a longitudinal axis 30 and two ends and longitudinal tips 11 at each end wherein the longitudinal axis 30 passes through the longitudinal tips 11, the primary reflector 10 having a length LP as measured along the longitudinal axis 30 between the two tips 11 wherein the longitudinal axis 30 has a center point 40 and the primary reflector 10 has a vertex OP, being the center of the surface of the primary reflector 10, the primary reflector 10 having an optical axis 5 perpendicular to the longitudinal axis 30 and passing through the vertex OP, the primary reflector 10 having a transverse axis 75 perpendicular to the longitudinal axis 30 and passing through the vertex point OP, the primary reflector 10 having a focal line, being the line toward which rays parallel to the optical axis 5 incident on the primary reflector 10, following reflection from the primary reflector 10, converge, which focal line is perpendicular to the optical axis 5 and the longitudinal axis 30 but parallel to the transverse axis 75, the primary reflector 10 having a focal length, the focal length being a distance along the optical axis 5 from the primary reflector 10 transverse axis 75 to the primary reflector 10 focal line, the primary reflector's optical axis 5 extending through the vertex OP and the longitudinal axis 30 center point 40 and perpendicular to both the longitudinal axis 30 and the transverse axis 75, the primary reflector 10 having a plane of symmetry that is perpendicular to the longitudinal axis 30 and that extends through the vertex OP and the longitudinal axis 30 center point 40, the primary reflector 10 having a profile, being a projection of the perimeter onto a plane perpendicular to the optical axis 5 forming the shape of an ellipse with a semi-minor axis, and the primary reflector 10 having a width WP that is twice the semi-minor axis of the ellipse of its profile and the primary reflector's length LP is twice the semi-major axis of its profile ellipse;

B. a convex parabolic trough as a secondary reflector 60, the secondary reflector 60 having a surface with a center, the secondary reflector 60 having a perimeter and a profile, the secondary reflector 60 having a transverse axis 70 perpendicular to the longitudinal axis 30 of the primary reflector 10 and contained within the surface of the secondary reflector, the secondary reflector 60 having a width WS as measured perpendicular to the primary reflector's longitudinal axis 30 and having a center point 90 or vertex OS, the secondary reflector 60 having a focal length and an optical axis 5, the latter being an extension of the optical axis 5 of the primary reflector 10 through the vertex OS 90 of the secondary reflector, the secondary vertex OS 90 being the intersection of the secondary reflector's optical axis 5 with the secondary reflector's surface, the secondary reflector 60 profile being a projection of the perimeter parallel to the optical axis 5 onto a plane perpendicular to the optical axis 5, the secondary reflector 60 having a focal line, being the line from which parallel rays parallel to the optical axis 5 incident on the secondary reflector, following reflection, diverge, which focal line is perpendicular to the optical axis 5 but parallel to the transverse axis, the secondary reflector 60 having a focal length, the focal length being a distance along the optical axis 5 from the secondary reflector 60 vertex OS 90 to the secondary reflector 60 focal line, the secondary vertex OS 90 being spaced from the primary vertex so as to place the focal lines of the primary 10 and secondary 60 reflectors into coincidence, the secondary reflector 60 having a plane of symmetry perpendicular to the longitudinal axis 30 and containing both the optical axis 5 and the transverse axis 70, the secondary reflector 60 profile being circular and having a diameter with a radius approximately equal to half the width of the primary reflector 10, wherein the longitudinal length of the primary reflector 10 is at least greater than the diameter of the profile of the secondary reflector 60; and C. said primary 10 and secondary 60 reflectors arranged in a Cassegrainian configuration, the primary reflector 10 having a hole 14A centered on the reflector's vertex OP, the hole 14A having a perimeter, a projection of that hole's perimeter onto a plane perpendicular to the optical axis 5 being circular with a diameter equal to or larger than the secondary reflector's 60 profile, to allow a beam reflected from the secondary mirror to pass through it.

In the preferred embodiment, the diameter of the secondary reflector 60 is 23", the width of the primary reflector 10 is generally 23", and the length of the primary reflector 10 is 160". In an alternate embodiment, the diameter of the secondary reflector 60 is 29" and the length of the primary reflector 10 is 140". In general, the diameter of the secondary reflector 60 and the length of the primary reflector 10 are such that the net concentration ratio is between 3 and 7. The choice of focal lengths of the primary 10 and secondary 60 reflectors results from practical considerations relating to keeping the design compact while avoiding flux reflected from the primary reflector 10 reaching the sides of or missing the secondary reflector, so no particular values for the focal lengths are specified for the preferred embodiment. Their choice depends upon the application, as long as the focal lines of the primary and secondary reflectors are in alignment.

The relationships between reflector sizes and concentration ratio are calculated as follows. Concentration ratio is the ratio of the spatially averaged irradiance or illuminance emerging to the spatially averaged irradiance or illuminance incident.

Since average irradiance is total flux P divided by area A, the average emerging irradiance or illuminance $E_{out}$ is given by $P_{out}/A_{out}$ and the average incoming irradiance or illuminance $E_{in}$ is given by $P_{in}/A_{in}$. There are losses in nearly every optical system, so if we define the system's flux transmittance $\tau$ as the ratio of emerging flux $P_{out}$ to incident flux $P_{in}$, we then have $P_{out}=\tau P_{in}$ which means that the concentration ratio C would be given by $$C=E_{out}/E_{in}=(P_{out}/A_{out})/(P_{in}/A_{in})=\tau A_{out}/A_{in}$$

The primary aperture is the elliptical or rectangular primary reflector's profile area of interception of the incident sunlight. However, the secondary blocks some of the incident flux, so we may define two different concentration ratios for our system. One we might call the "overall concentration ratio" and it would have $A_{in}$ represent the total area of the primary's entrance aperture: its profile area. In this "overall" definition, we would use the secondary reflector 60 profile area (equal to the cross-sectional area of the output beam from the secondary mirror) as $A_{out}$. The area of an ellipse of semi-major and semi-minor axes $r_1$ and $r_2$, respectively, is $\pi \times r_1 \times r_2$. The area of a circle of radius r is $\pi \times r^2$. Thus, if $r_1$ and $r_2$ are the semi-axes of the primary's aperture and $r_e$ is the radius of the circular cross-section of the emerging beam, the overall concentration ratio would be $$C_{overall}=(r_1 \times r_2)/r_e^2$$

for an elliptical profile primary reflector 10 and circular profile secondary reflector. This formula is easily adjusted for rectangular and square profile primary or secondary reflectors.

To estimate the magnitude of the emerging flux, a second concentration ratio definition called the effective or net concentration ratio $C_{net}$ can be used. This would be defined as the transmittance $\tau$ times the entrance aperture area minus the obscuration area of the secondary mirror divided by the cross-sectional area of the emerging beam, the latter we take to be equal to the area of the secondary mirror's profile.

To calculate the areas in the concentration ratio formulas, we use the ellipse area formula, $\pi(r_1 \times r_2)$, for elliptical profile mirrors and the length times the width for rectangular profile ones. To get the emerging flux, one simply multiplies the incident solar irradiance or illuminance $E_{in}$ by the net entrance aperture area (profile area of the primary mirror less that of the secondary) and then by τ. The average emerging irradiance or illuminance $E_{out}$ is the emerging flux by the cross-sectional area of the emerging beam.

Alternate Embodiment

The Truncated Secondary Reflector Having a Circular Profile and the Truncated Primary Reflector Having an Elliptical Profile, in the Cassegrainian Configuration [FIGS. 16 & 17]

FIG. 13 shows the result of a computerized optical ray trace of the Cassegrain configuration shown in FIGS. 1 and 2. The small dot marks are the locations of ray intersections with a plane perpendicular to the optical axis 5 placed in the beam reflected from the secondary reflector 60. As shown in FIG. 13, the preferred embodiment results in an elliptical lacuna 110 in the beam off the secondary reflector 60, caused by the shadow of the secondary reflector 60 on the primary reflector 10. The circular shadow is squeezed by the focusing action of the primary reflector 10 so that it shows up as an ellipse in the beam reflected from the secondary reflector. The lacuna 110 can be removed from the emerging beam with the following modification. As shown in FIGS. 16 and 17 for the Cassegrainian configuration, which is this alternate embodiment of the preferred embodiment, the system is modified as follows:
A. the primary reflector 10 has removed from both sides of its plane of symmetry a first rectangle,
the first rectangle having a length D equal to the diameter of the secondary reflector,
the first rectangle having a width T/2 matching half the width of a center of a lacuna 110 in a beam reflected from the secondary reflector 60 and passing through a hole at the vertex OP of the primary reflector 10, said lacuna 110 being the shadow of the secondary reflector 60 on the primary reflector 10 as narrowed by the focusing or concentrating action of the primary reflector 10,
resulting in two truncated halves 10A,B of the primary reflector 10, which halves are then rejoined along the plane of symmetry;
B. the secondary reflector 60 has removed from both sides of its plane of symmetry a second rectangle,
the second rectangle having a length D equal to the diameter of the secondary reflector,
the second rectangle having a width T/2 matching half the width of a center of a lacuna 110 in a beam reflected from the secondary reflector 60 and passing through a hole centered on the vertex OP of the primary reflector 10;
C. resulting in two truncated halves 60A,B of the secondary reflector 60, which halves 60A,B are then rejoined at the plane of symmetry.

In one version of this configuration the width of the secondary reflector is 23", its length is 23", less the width T of the truncated section of the two reflectors (i.e. 23"–T) and the length of the primary reflector 10 is (160"–T). In an alternate version, the width of the secondary reflector is 29", its length is (29"–T), and the length of the primary reflector 10 is (140"–T). In general, the device has a net concentration ratio, wherein the width of the secondary reflector 60 and the length of the primary reflector 10 are such that the net concentration ratio is between 3 and 7.

FIG. 22 shows a spot diagram of the beam emerging from the secondary reflector 60 for the split and rejoined primary 10 and secondary 60 reflectors. In FIG. 22, the ray positions in the beam reflected from the secondary reflector 60 are marked with plus (+) signs to make them more visible. This split primary/secondary configuration lacks the elliptical lacuna 110, and the resulting beam has a generally uniform distribution, as shown in the spot diagram provided in FIGS. 22 and 23, the different distributions of the rays in these two diagrams being explained below.

Alternate Embodiment

With the Secondary Reflector Having a Circular Profile and the Primary Reflector Having an Elliptical Profile, in the Gregorian Configuration [FIGS. 3 & 4]

As shown in FIGS. 3 and 4, the embodiments of the present invention also include another embodiment of the preferred, an optical concentration and collimation system comprised of:
A. a concave parabolic trough as a primary reflector 10,
the primary reflector 10 having a perimeter and a surface with a center,
the primary reflector 10 having a longitudinal axis 30 and two ends and longitudinal tips 11 at each end wherein the longitudinal axis 30 passes through the longitudinal tips 11,
the primary reflector 10 having a length LP as measured along the longitudinal axis 30 wherein the longitudinal axis 30 has a center point 40, and the primary reflector 10 has a center point 40 or vertex OP, being the center of the surface of the primary reflector 10,
the primary reflector 10 having a transverse axis 75 perpendicular to the longitudinal axis 30, passing through the primary reflector's vertex OP, and being contained within the surface of the reflector,
the primary reflector 10 having a focal line, being the line toward which parallel rays parallel to the optical axis 5 incident on the primary reflector 10, following reflection from the primary reflector 10, converge, which focal line is perpendicular to the optical axis 5 and the longitudinal axis 30 but parallel to the transverse axis 75,
the primary reflector 10 having a focal length, the focal length being a distance along the optical axis 5 from the primary reflector 10 vertex OP to the primary reflector 10 focal line,
the primary reflector 10 having an optical axis 5 extending through the center point 40 of the longitudinal axis 30 and perpendicular to both the longitudinal axis 30 and the transverse axis while also passing through the primary vertex OP of the primary reflector 10,
the primary reflector 10 having a plane of symmetry that is perpendicular to the longitudinal axis 30 and that extends through the center point 40 and that also includes the vertex OP, the optical axis 5, and the transverse axis 75,
the primary reflector 10 having a profile, being a projection of the perimeter onto a plane perpendicular to the optical axis 5 forming the shape of an ellipse with a semi-minor axis,
and the primary reflector 10 profile having a width WP that is twice the semi-minor axis of the ellipse and the primary reflector's 10 profile length LP is twice the semi-major axis of the ellipse;
B. a concave parabolic trough as a secondary reflector 60,
the secondary reflector having a surface with a center,
the secondary reflector having a perimeter, the secondary reflector 60 having a profile, being the projection of the perimeter of the secondary reflector 60 onto a plane perpendicular to the optical axis 5 and forming a circular profile with a diameter D and a radius approximately equal to half the width of the primary reflector 10, the secondary reflector 60 having a surface, the secondary reflector 60 having a transverse axis 70 perpendicular to the longitudinal axis 30 and contained within the secondary reflector's surface, the secondary reflector 60 profile having a width WS as measured parallel to the transverse axis, the secondary reflector 60 having a transverse axis 70, the secondary reflector 60 having a focal length and a secondary vertex OS 90, the secondary reflector 60 having a focal line, being the line from which parallel rays parallel to the optical axis 5 incident on the secondary reflector, following reflection, diverge, which focal line is perpendicular to the optical axis 5 but parallel to the transverse axis, the secondary reflector 60 having a focal length, the focal length being a distance along the optical axis 5 from the secondary reflector 60 vertex OS 90 to the secondary reflector 60 focal line, the secondary reflector 60 having an optical axis 5 being an extension of the primary reflector's optical axis 5, being perpendicular to the longitudinal axis 30 and passing through the secondary vertex OS 90 of the secondary reflector, the secondary vertex OS 90 being the intersection of the secondary reflector's optical axis 5 with the secondary reflector's 60 surface, the secondary vertex OS 90 being spaced from the primary vertex so as to place the focal lines of the primary and secondary reflectors into coincidence, the secondary reflector 60 having a plane of symmetry perpendicular to the longitudinal axis 30 and containing the optical axis 5, the secondary reflector 60 profile having a diameter, wherein LP is at least greater than D; and C. said primary 10 and secondary 60 reflectors arranged in a Gregorian configuration, the primary reflector 10 having a circular hole 14A centered on the reflector's vertex OP, the hole 14A having a perimeter, a projection of that hole's perimeter onto a plane perpendicular to the optical axis 5 being circular with a diameter equal to or larger than the secondary reflector's 60 profile, to allow a beam reflected from the secondary mirror to pass through it.

In one version of this configuration, the diameter of the secondary reflector 60 is 23", the width of the primary reflector 10 is generally 23", and the length of the primary reflector 10 is 160". In an alternate version, the diameter of the secondary reflector 60 is 29" and the length of the primary reflector 10 is 140". In general, the device has a net concentration ratio, wherein the diameter of the secondary reflector 60 and the length of the primary reflector 10 are such that the net concentration ratio is between 3 and 7.

The choice of focal lengths of the primary 10 and secondary 60 reflectors is discussed above for the preferred embodiment. That discussion also applies to this embodiment. The relationships between reflector sizes and concentration ratio are also discussed above, which discussion applies as well to this embodiment.

Alternate Embodiment

With the Secondary Reflector Having a Square Profile and the Primary Reflector Having a Rectangular Profile, in the Cassegrainian Configuration [FIGS. 5 & 6]

As shown in FIGS. 5 and 6, the embodiments of the present invention also include another optical concentration and collimation system, comprising:

A. a concave parabolic trough as a primary reflector 10, the primary reflector 10 having a perimeter and a surface with a center, the primary reflector 10 having a longitudinal axis 30 and two ends and longitudinal tips 11 at each end wherein the longitudinal axis 30 passes through the longitudinal tips 11, the primary reflector 10 having a length LP as measured along the longitudinal axis 30 wherein the longitudinal axis 30 has a center point 40, the primary reflector 10 having a transverse axis 75 perpendicular to the longitudinal axis 30 and coincident with the surface of the primary reflector, the primary reflector 10 having an optical axis 5 extending through the longitudinal axis 30 center point 40, perpendicular to both the longitudinal axis 30 and the transverse axis 75, while also passing through the vertex OP of the primary reflector, the primary vertex OP being the intersection of the primary reflector's 10 optical axis 5 with the primary reflector's 10 surface, the primary reflector 10 having a plane of symmetry that is perpendicular to the longitudinal axis 30 and that extends through the vertex OP and that also is coincident with the transverse axis 75, the primary reflector 10 having a profile, being a projection of the perimeter onto a plane perpendicular to the optical axis 5 forming the shape of an ellipse with a semi-minor axis, and the primary reflector 10 having a width WP that is twice the semi-minor axis of the profile's ellipse and the primary reflector's length LP is twice the semi-major axis of that ellipse the primary reflector 10 having a focal line, being the line toward which rays parallel to the optical axis 5 incident on the primary reflector, following reflection from the primary reflector, converge, which focal line is perpendicular to the optical axis 5 and the longitudinal axis 30 but parallel to the transverse axis 75, the primary reflector 10 having a focal length, being the distance from the primary's transverse axis 75 to the primary reflector 10 focal line;

B. a convex parabolic trough as a secondary reflector, the secondary reflector having a surface with a center, the secondary reflector having a perimeter, the secondary reflector 60 having a transverse axis 70 perpendicular to the primary reflector's longitudinal axis 30 and coincident with secondary reflector 60 surface, the secondary reflector 60 having a width WS as measured parallel to the transverse axis 70, the secondary reflector 60 having a focal length and a secondary vertex OS, the secondary vertex being the center point 40 of the secondary reflector's surface, the secondary reflector 60 having an optical axis 5 extending through the longitudinal axis 30 center point 40, the secondary reflector 60 vertex OS, and being perpendicular to the longitudinal axis 30, the secondary reflector 60 having a plane of symmetry containing the optical axis 5 and the transverse axis 70, the secondary reflector 60 having a focal line, being the line from which parallel rays parallel to the optical axis 5 incident on the secondary reflector, following reflection, diverge, which focal line is perpendicular to the optical axis 5 but parallel to the transverse axis 70, the secondary reflector 60 having a focal length, the focal length being a distance along the optical axis 5 from the secondary reflector 60 vertex OS to the secondary reflector 60 focal line, the secondary vertex being spaced from the primary vertex so as to place the focal lines of the primary 10 and secondary 60 reflectors into coincidence, the secondary reflector 60 having a square profile with sides of the square approximately equal to the width of the primary reflector, wherein LP is at least greater than WS; and C. said primary 10 and secondary 60 reflectors arranged in a Cassegrainian configuration, the primary reflector 10 having a square hole 14A centered on the reflector's vertex OP, the hole 14A having a perimeter, a projection of that hole's 14A perimeter onto a plane perpendicular to the optical axis 5 being square with a width equal to or larger than the secondary reflector's profile, to allow a beam reflected from the secondary mirror to pass through it.

In one version of this configuration, the length of each side of the secondary reflector 60 is 23" and the length of the primary reflector 10 is 160". In an alternate version, the length of each side of the secondary reflector 60 is 29" and the length of the primary reflector 10 is 140". In general, the device has a net concentration ratio, wherein the length of each side of the secondary reflector 60 and the length of the primary reflector 10 are such that the net concentration ratio is between 3 and 7.

The choice of focal lengths of the primary 10 and secondary 60 reflectors is discussed above for the preferred embodiment. That discussion also applies to this embodiment. The relationships between reflector sizes and concentration ratio are also discussed above, which discussion applies as well to this embodiment.

Alternate Embodiment

Figure 8B:
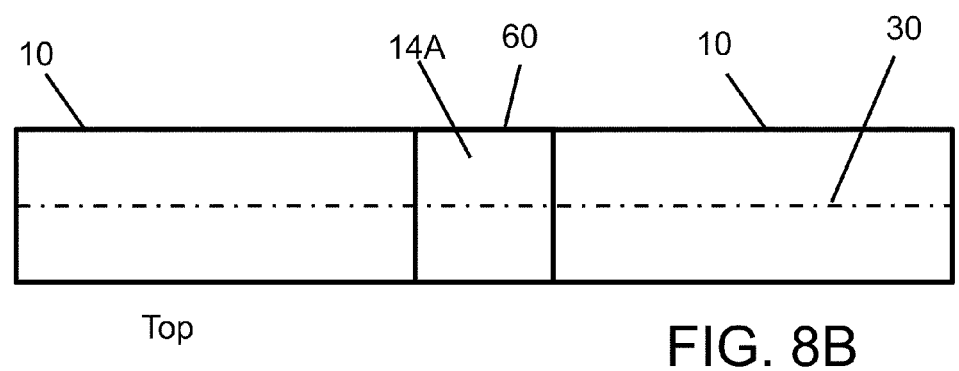
Figure 8C:
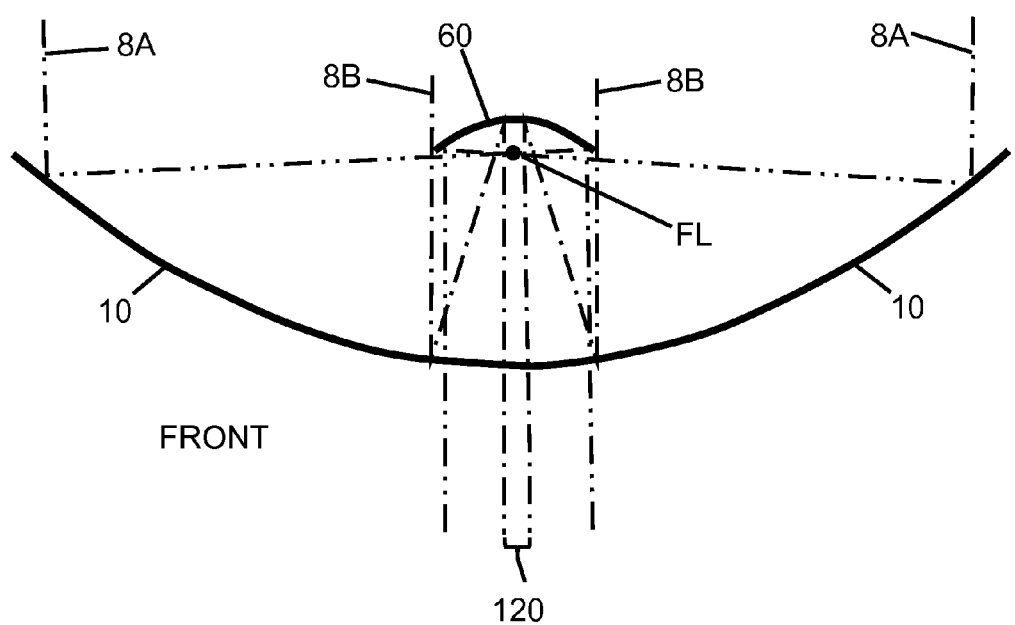

With the Secondary Reflector Having a Square Profile and the Primary Reflector Having a Rectangular Profile, in the Gregorian Configuration [FIGS. 7 & 8]

As shown in FIGS. 7 and 8, the embodiments of the present invention also include an optical concentration and collimation system, comprising:

A. a concave parabolic trough as a primary reflector 10, the primary reflector having a perimeter and a surface with a center, the primary reflector 10 having a longitudinal axis 30 and two ends and longitudinal tips 11 at each end wherein the longitudinal axis 30 passes through the longitudinal tips 11, the primary reflector having a length LP as measured along the longitudinal axis 30 wherein the longitudinal axis 30 has a center point 40, the primary reflector 10 having a focal length and a primary vertex OP, the primary vertex being the center point 40 of the primary reflector's 10 surface, the primary reflector 10 having an optical axis 5 perpendicular to the longitudinal axis 30 and passing through the primary vertex OP of the primary reflector 10, the primary reflector 10 having a transverse axis perpendicular to the longitudinal axis 30 and passing through the vertex OP, the primary reflector 10 having a plane of symmetry that is perpendicular to the longitudinal axis 30, and that extends through the vertex and that also includes the transverse axis 75, the primary reflector 10 having a focal line, being the line toward which parallel rays parallel to the optical axis 5 incident on the primary reflector, following reflection from the primary reflector, converge, which focal line is perpendicular to the optical axis 5 and the longitudinal axis 30 but parallel to the transverse axis 75, the primary reflector 10 having a focal length, being the distance from the primary reflector 10 transverse axis 75 to the focal line, the primary reflector 10 having a profile, being a projection of the perimeter onto a plane perpendicular to the optical axis 5 forming the shape of an ellipse with a semi-minor axis, and the primary reflector 10 having a width WP that is twice the semi-minor axis of the ellipse and the primary reflector's length LP is twice the semi-major axis of the ellipse;

B. a concave parabolic trough as a secondary reflector 60, the secondary reflector having a surface with a center, the secondary reflector having a perimeter and a profile, the secondary reflector 60 having a width WS as measured parallel to the longitudinal axis 30, the secondary reflector 60 having a transverse axis 70 perpendicular to the longitudinal axis 30, containing the primary reflector's optical axis 5, and parallel to the primary reflector's transverse axis 70, the secondary reflector 60 having a focal length and a secondary vertex, the secondary vertex OS 90 being the center of the secondary reflector's 60 surface, the secondary reflector 60 having an optical axis 5 extending through the center point OS 90 and perpendicularly to the longitudinal axis 30 and passing through the vertex OS 90 of the secondary reflector 60, the secondary reflector 60 having a focal line, being the line from which parallel rays parallel to the optical axis 5 incident on the secondary reflector 60, following reflection, diverge, which focal line is perpendicular to the optical axis 5 but parallel to the transverse axis 70, the secondary reflector 60 having a focal length, being a distance from the secondary reflector 60 transverse axis to the secondary reflector 60 focal line, the secondary vertex OS 90 being spaced from the primary vertex OP so as to place the focal lines of the primary 10 and secondary 60 reflectors into coincidence, the secondary reflector 60 having a plane of symmetry perpendicular to the longitudinal axis 30 and containing the optical axis 5 and the transverse axis 70, the secondary reflector 60 having a square profile with sides of the square approximately equal to the width of the primary reflector, wherein LP is at least greater than WS; and C. said primary 10 and secondary 60 reflectors arranged in a Gregorian configuration the primary reflector 10 having a hole 14A centered on the reflector's vertex OP, the hole 14A having a perimeter, a projection of that hole's 14A perimeter onto a plane perpendicular to the optical axis 5 being square with a width equal to or larger than the secondary reflector's profile, to allow a beam reflected from the secondary mirror to pass through it.

In one version of this configuration the diameter of the secondary reflector 60 is 23", the width of the primary reflector 10 is generally 23", and the length of the primary reflector 10 is 160". In an alternate version, the diameter of the secondary reflector 60 is 29" and the length of the primary reflector 10 is 140". In general, the device has a net concentration ratio, wherein the diameter of the secondary reflector 60 and the length of the primary reflector 10 are such that the net concentration ratio is between 3 and 7.

The choice of focal lengths of the primary and secondary reflectors is discussed above for the preferred embodiment. That discussion also applies to this embodiment. The relationships between reflector sizes and concentration ratio are also discussed above, which discussion applies as well to this embodiment.

Alternate Embodiment

Figure 10B:
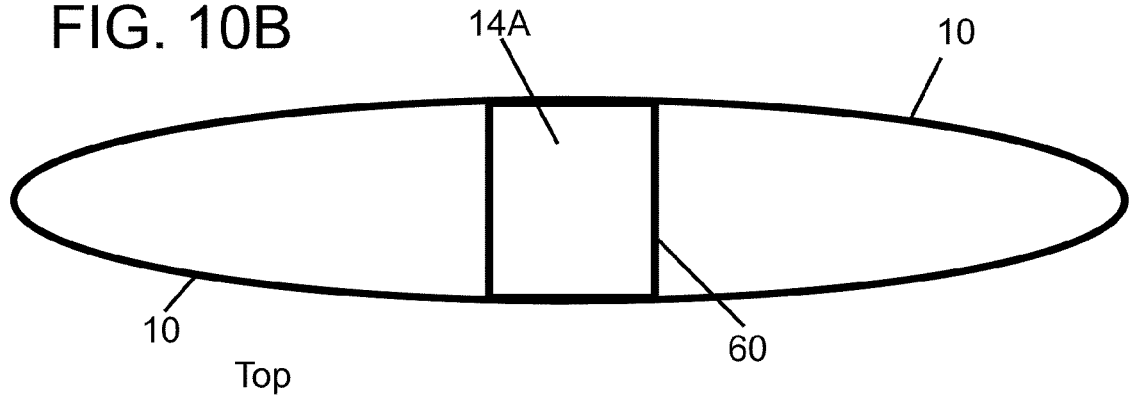
Figure 10C:
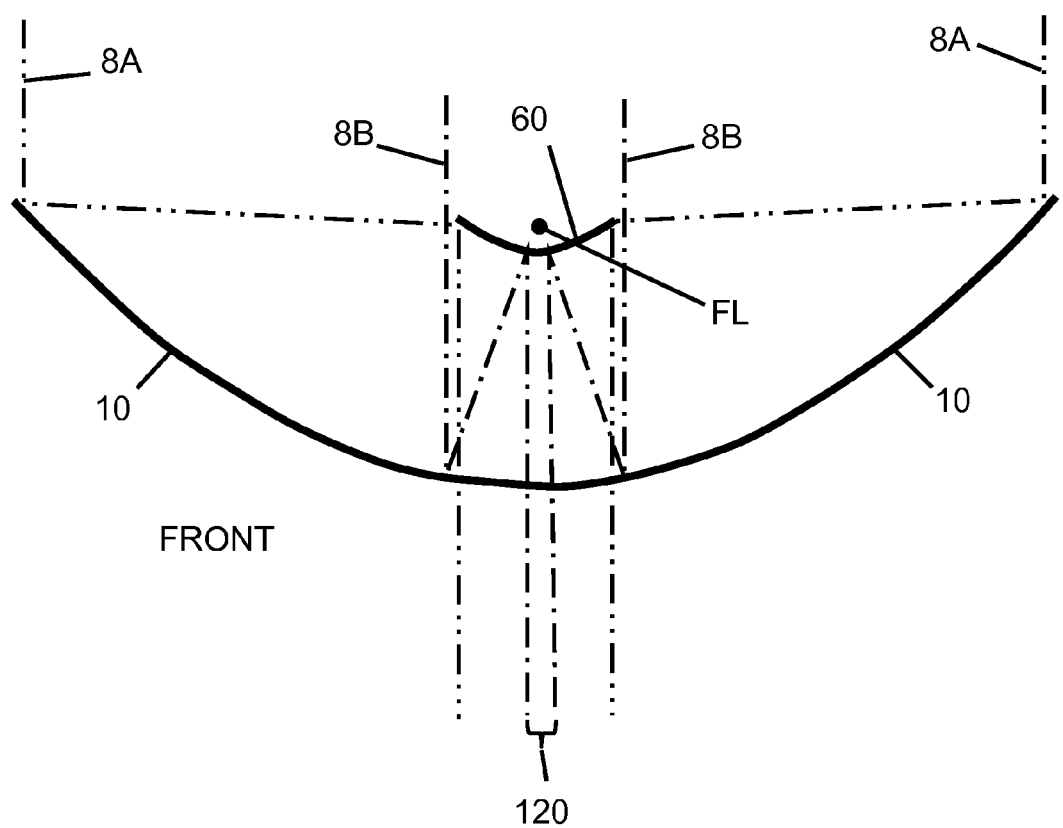

With the Secondary Reflector Having a Square Profile and the Primary Reflector Having an Elliptical Profile, in the Cassegrainian Configuration [FIGS. 9 & 10]

As shown in FIGS. 9 and 10, the embodiments of the present invention also include an optical concentration and collimation system, comprising:
A. a concave parabolic trough as a primary reflector, the primary reflector having a perimeter and a surface with a center,
the primary reflector 10 having a longitudinal axis 30 and two ends and longitudinal tips 11 at each end wherein the longitudinal axis 30 passes through the longitudinal tips,
the primary reflector 10 having a length LP as measured along the longitudinal axis 30 wherein the longitudinal axis 30 has a center point 40,
the primary reflector 10 having a transverse axis perpendicular to the longitudinal axis 30, passing through the center of the mirror surface, and being coincident with the reflector surface,
the primary reflector 10 having a focal length and a vertex OP, the primary vertex being the center of the primary reflector's surface,
the primary reflector 10 having an optical axis 5 extending through the vertex and being perpendicular to both the longitudinal axis 30 and the transverse axis while also passing through the vertex OP of the primary reflector,
the primary reflector 10 having a focal line, being the line toward which parallel rays parallel to the optical axis 5 incident on the primary reflector, following reflection from the primary reflector, converge, which focal line is perpendicular to the optical axis 5 and the longitudinal axis 30 but parallel to the transverse axis,
the primary reflector 10 having a focal length, being the distance from the transverse axis to the primary reflector 10 focal line,
the primary reflector 10 having a plane of symmetry that is perpendicular to the longitudinal axis 30 and that extends through the vertex OS of the primary reflector,
the primary reflector 10 having a perimeter, the projection of the perimeter onto a plane perpendicular to the optical axis 5 being the profile in the shape of a rectangle;
B. a convex parabolic trough as a secondary reflector, the secondary reflector having a surface with a center,
the secondary reflector having a perimeter and a profile, the secondary reflector 60 having a width WS as measured perpendicular to the primary reflector's longitudinal axis 30,
the secondary reflector 60 having a transverse axis perpendicular to the longitudinal axis 30 and contained in the secondary reflector 60 surface,
the secondary reflector 60 having a focal length and a secondary vertex OS, the secondary vertex being the intersection of the secondary reflector's optical axis 5 with the secondary reflector's surface,
the secondary reflector 60 having an optical axis 5 extending through the vertex OS while being perpendicular to the longitudinal axis 30 and passing through the center of the secondary reflector 60 surface,
the secondary reflector 60 having a focal line, being the line from which parallel rays parallel to the optical axis 5 incident on the secondary reflector, following reflection, diverge, which focal line is perpendicular to the optical axis 5 but parallel to the transverse axis,
the secondary reflector 60 having a focal length, being a distance from the secondary reflector 60 transverse axis to the secondary reflector 60 focal line,
the secondary vertex being spaced from the primary vertex so as to place the focal lines of the primary and secondary reflectors into coincidence,
the secondary reflector 60 having a plane of symmetry perpendicular to the longitudinal axis 30 and containing both the optical and the transverse axis,
the secondary reflector 60 having a square profile the profile having a width WS equal to the width WP of the primary reflector,
wherein LP is at least greater than WS; and
C. said primary and secondary reflectors in a Cassegrainian configuration, the primary reflector 10 having a hole 14A centered on the reflector's vertex OP, the hole 14A having a perimeter, a projection of that hole's 14A perimeter onto a plane perpendicular to the optical axis 5 being square with a width equal to or larger than the secondary reflector's profile, to allow a beam reflected from the secondary mirror to pass through it.

In one version of this configuration, the length of each side of the secondary reflector 60 is 23" and the length of the primary reflector 10 is 160". In an alternate version, the length of each side of the secondary reflector 60 is 29" and the length of the primary reflector 10 is 140". In general, the device has a net concentration ratio, wherein the length of each side of the secondary reflector 60 and the length of the primary reflector 10 are such that the net concentration ratio is between 3 and 7.

The choice of focal lengths of the primary and secondary reflectors is discussed above for the preferred embodiment. That discussion also applies to this embodiment. The relationships between reflector sizes and concentration ratio are also discussed above, which discussion applies as well to this embodiment.

Alternate Embodiment

Figure 12B:
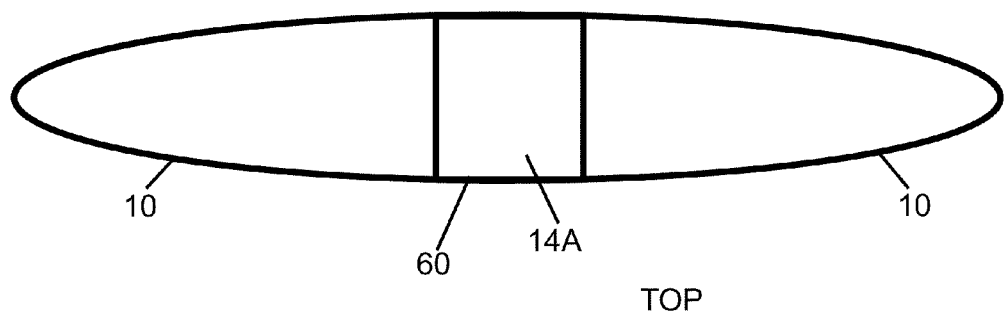
Figure 12C:
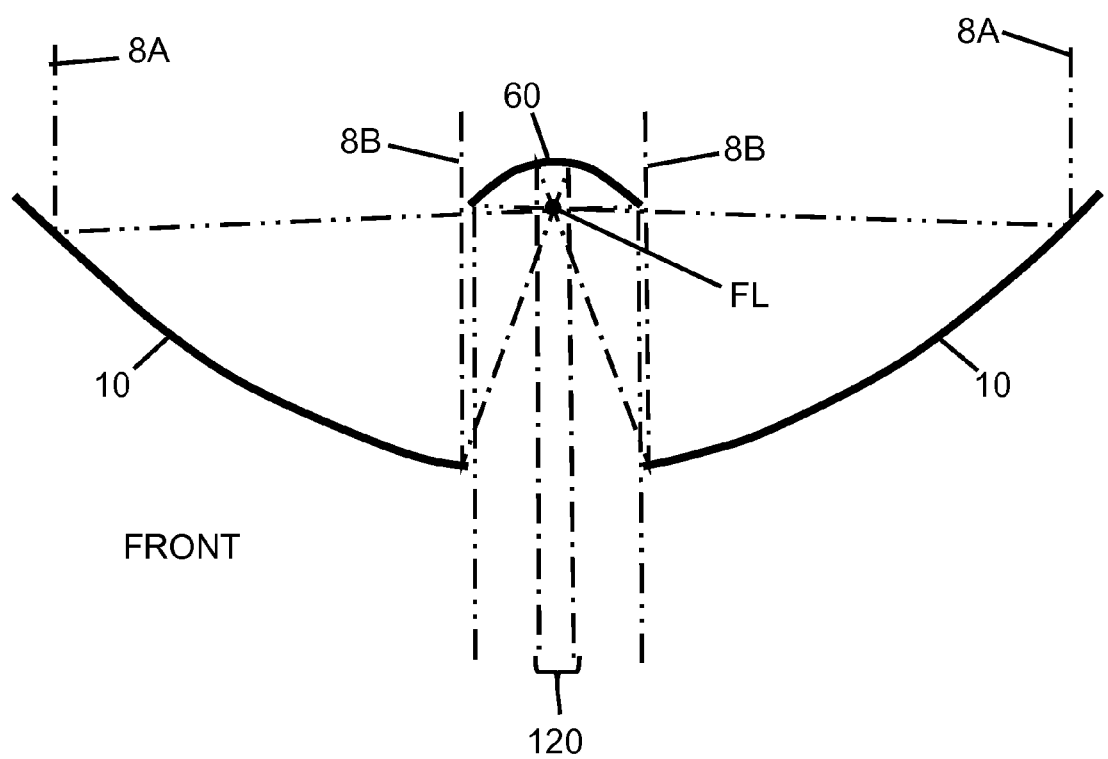

With the Secondary Reflector Having a Square Profile and the Primary Reflector Having an Elliptical Profile, in the Gregorian Configuration [FIGS. 11 & 12]

As shown in FIGS. 11 and 12, the embodiments of the present invention also include an optical concentration and collimation system, comprising:
A. a concave parabolic trough as a primary reflector, the primary reflector having a perimeter and a surface with a center,
the primary reflector 10 having a longitudinal axis 30 and two ends and longitudinal tips 11 at each end wherein the longitudinal axis 30 passes through the longitudinal tips 11,
the primary reflector 10 having a length LP as measured along the longitudinal axis 30 wherein the longitudinal axis 30 has a center point 40,
the primary reflector 10 having a transverse axis 75 perpendicular to the longitudinal axis 30 and contained within the primary reflector 10 surface,
the primary reflector 10 having a focal length and a primary vertex,
the primary reflector 10 having an optical axis 5 extending through the center point 40 and perpendicular to both the longitudinal axis 30 and the transverse axis while also passing through the primary vertex of the primary reflector, the primary vertex being the intersection of the primary reflector's optical axis 5 with the primary reflector's surface, the primary reflector 10 having a focal line, being the line toward which parallel rays parallel to the optical axis 5 incident on the primary reflector, following reflection from the primary reflector, converge, which focal line is perpendicular to the optical axis 5 and the longitudinal axis 30 but parallel to the transverse axis 75, the primary reflector 10 having a focal length, being the distance from the transverse axis to the primary reflector 10 focal line, the primary reflector 10 having a plane of symmetry that is perpendicular to the longitudinal axis 30 and that extends through the center point 40 and that also includes the transverse axis, the primary reflector 10 having a perimeter, the projection of the perimeter onto a plane perpendicular to the optical axis 5 forming the shape of a rectangle;

B. a concave parabolic trough as a secondary reflector, the secondary reflector having a surface with a center, the secondary reflector having a perimeter and a profile, the secondary reflector 60 having a width WS as measured perpendicular to the longitudinal axis 30, the secondary reflector 60 having a transverse axis 70 perpendicular to the longitudinal axis 30 and coincident within the reflector surface, the secondary reflector 60 having a focal length and a secondary vertex, the secondary vertex being the intersection of the secondary reflector's optical axis 5 with the secondary reflector's surface, the secondary reflector 60 having an optical axis 5 extending through the vertex OS and perpendicularly to the longitudinal axis 30 of the secondary reflector, the secondary reflector 60 having a focal line, being the line from which parallel rays parallel to the optical axis 5 incident on the secondary reflector, following reflection, diverge, which focal line is perpendicular to the optical axis 5 but parallel to the transverse axis 70, the secondary reflector 60 having a focal length, being the distance from the transverse axis 70 to the focal line, the secondary vertex being spaced from the primary vertex so as to place the focal lines of the primary and secondary reflectors into coincidence, the secondary reflector 60 having a plane of symmetry perpendicular to the longitudinal axis 30 and containing the transverse axis, the secondary reflector 60 having a square profile with sides of the square approximately equal to the width of the primary reflector, wherein LP is at least greater than WS; and C. said primary and secondary reflectors in a Gregorian configuration, the primary reflector 10 having a square hole 14A centered on the reflector's vertex OP, the hole 14A having a perimeter, a projection of that hole's 14A perimeter onto a plane perpendicular to the optical axis 5 being square with a width equal to or larger than the secondary reflector's profile, to allow a beam reflected from the secondary mirror to pass through it.

In one version of this configuration, the length of each side of the secondary reflector 60 is 23" and the length of the primary reflector 10 is 160". In an alternate version, the length of each side of the secondary reflector 60 is 29" and the length of the primary reflector 10 is 140". In general, the device has a net concentration ratio, wherein the length of each side of the secondary reflector 60 and the length of the primary reflector 10 are such that the net concentration ratio is between 3 and 7.

The choice of focal lengths of the primary and secondary reflectors is discussed above for the preferred embodiment. That discussion also applies to this embodiment. The relationships between reflector sizes and concentration ratio are also discussed above, which discussion applies as well to this embodiment.

Alternate Embodiment

Figure 19B:
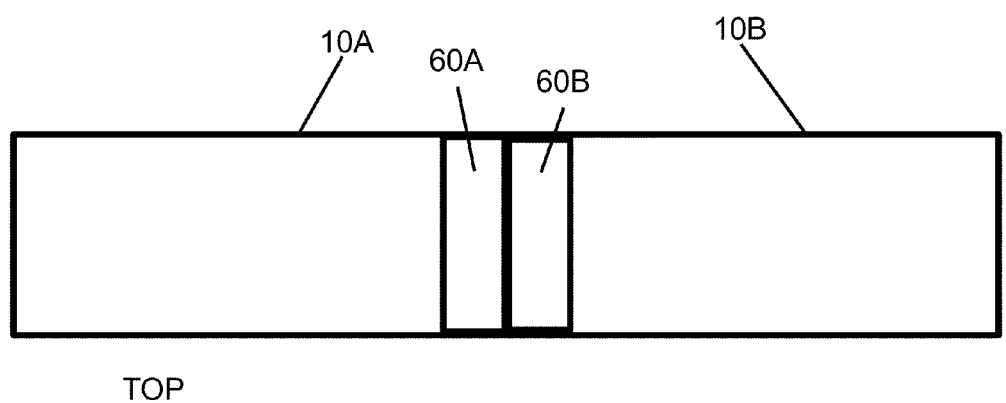
Figure 19C:
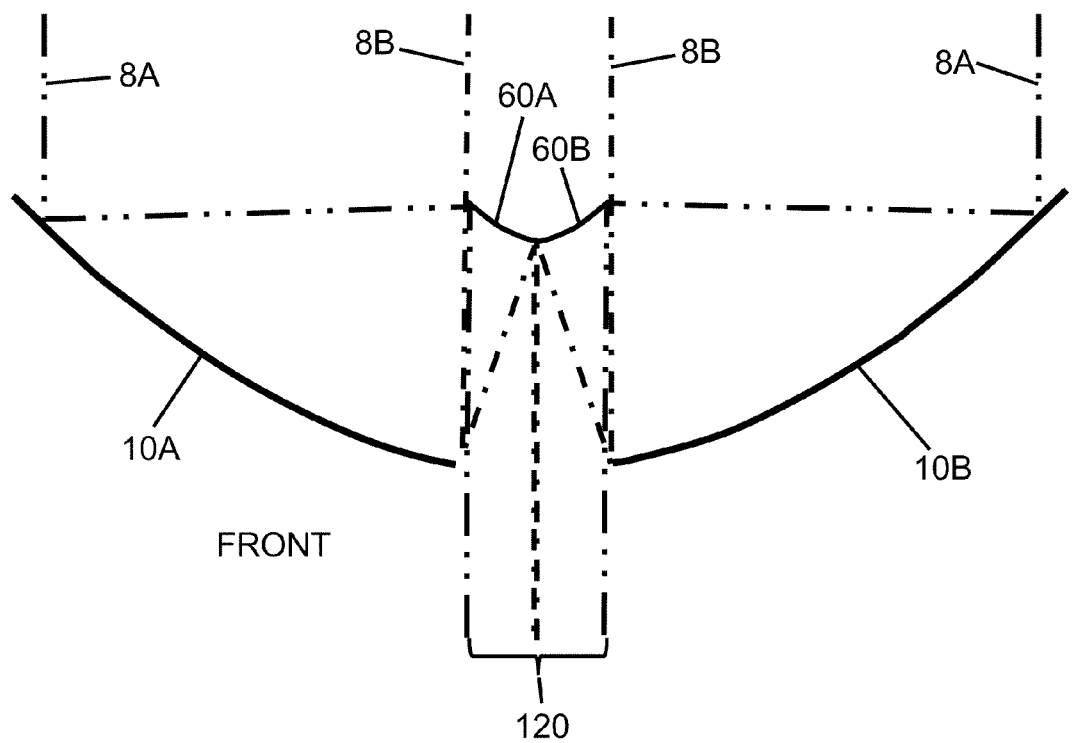

The Truncated Secondary Reflector Having a Square Profile and the Truncated Primary Reflector Having a Rectangular Profile, in the Cassegrainian Configuration [FIGS. 18 & 19]

As shown in FIG. 14, one an alternate embodiment results in a rectangular lacuna 120 in the beam reflected from the secondary reflector 60 caused by the shadow of the square secondary reflector 60 on the primary reflector 10. This shadow can be removed with the following modification. As shown in FIGS. 15B, 18, and 19 for the Cassegrainian configuration, in an alternate embodiment of the preferred embodiment, the system is modified as follows:

A. the primary reflector 10 has removed from both sides of its plane of symmetry a first rectangle 130, the first rectangle 130 having a length D equal to the length of each side of the profile of the secondary reflector, the first rectangle 130 having a width T/2 matching half the width of a center of a lacuna 110 in a beam reflected from the secondary reflector 60 and passing through a hole 14B at the center point 40 of the primary reflector, resulting in two truncated halves 10A,B of the primary reflector 10, which halves 10A,B are then rejoined along the plane of symmetry;

B. the secondary reflector 60 has removed from both sides of its plane of symmetry a second rectangle 130, the second rectangle 130 having a length D equal to the diameter of the secondary reflector, the second rectangle 130 having a width T/2 matching half the width of a center of a lacuna 110 in a beam reflected from the secondary reflector 60 and passing through a hole 14B at the center point 40 of the primary reflector; and C. resulting in two truncated halves 60A,B of the secondary reflector 60, which halves 60A,B are then rejoined along the plane of symmetry.

In one version of this configuration, the width of the secondary reflector 60 is 23", its length is (23"−T), and the length of the primary reflector 10 is (160"−T). In an alternate version, the width of the secondary reflector 60 is 29", its length is (29"−T), and the length of the primary reflector 10 is (140"−T). In general, the device has a net concentration ratio, wherein the length of the secondary reflector 60 and the length of the primary reflector 10 are such that the net concentration ratio is between 3 and 7.

This split trough configuration lacks the rectangular lacuna 120 seen in FIG. 14, and the resulting beam retains a uniform distribution, as illustrated for the elliptical primary and circular secondary cases with the ray-traced spot diagram shown in FIG. 22. When the non-truncated embodiments described above are simulated with a solar-emulating source, i.e., slightly divergent rays are sent through, the resultant beam spreading produces a partial filling in of the lacuna 120 observed in the beam when only parallel rays are used. FIG. 23 shows a spot diagram similar to that shown for one of the untruncated embodiments in FIG. 13, but with a source beam of simulated solar radiation filling a 0.5 deg angular spread centered on the optical axis 5 with random positioning of the rays in this source beam. The spreading of the solar rays fills in the lacuna 120 well but produces a slightly non-circular perimeter to the rays and several outlier rays are also evident. The presence of these outliers is not matched by significant illuminance outside the main cluster of rays.

Alternate Embodiment

Figure 21B:
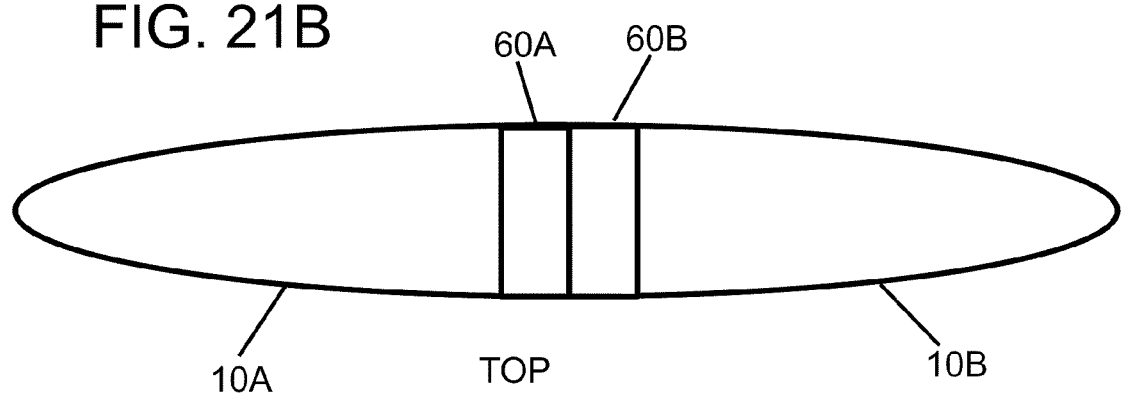
Figure 21C:
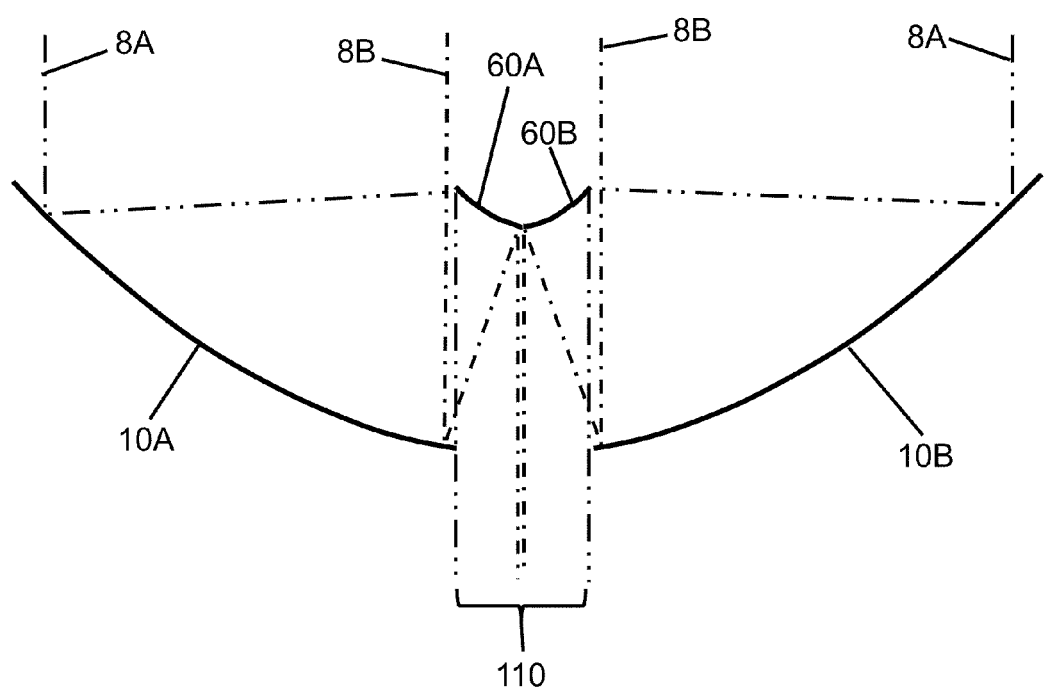

The Truncated Secondary Reflector Having a Square Profile and the Truncated Primary Reflector Having an Elliptical Profile, in the Cassegrainian Configuration [FIGS. 20 & 21]

As shown in FIG. 14, the preferred embodiment results in a rectangular lacuna 120 in the beam reflected from the secondary reflector 60, caused by the shadow of the secondary reflector 60 on the primary reflector 10. This shadow can be removed with the following modification. As shown in FIGS. 20 and 21 for the Cassegrainian configuration, in an alternate embodiment of the preferred embodiment, the system is modified as follows:

A. the primary reflector 10 has removed from both sides of its plane of symmetry a first rectangle 130,
the first rectangle 130 having a length D equal to the length of each side of the secondary reflector 60 profile, the first rectangle having a width T/2 matching half the width of a center of a lacuna 110 in a beam reflected from the secondary reflector 60 and passing through a hole 14B at the center point 40 of the primary reflector,
resulting in two truncated halves 10A,B of the primary reflector, which halves 10A,B are then each moved toward the plane of symmetry through distance T/2; and
B. the secondary reflector 60 has removed from both sides of its plane of symmetry a second rectangle 130,
the second rectangle 130 having a length D equal to the diameter of the secondary reflector, the second rectangle 130 having a width T/2 matching half the width of a center of a lacuna 110 in a beam reflected from the secondary reflector 60 and passing through a hole 14B at the center point 40 of the primary reflector,
C. resulting in two truncated halves 60A,B of the secondary reflector, which halves 60A,B are then rejoined along the plane of symmetry.

In one version of this configuration, the width of the secondary reflector 60 is 23", its length is (23"−T), and the length of the primary reflector 10 is (160"−T). In an alternate version, the width of the secondary reflector 60 is 29", its length is (29"−T), and the length of the primary reflector 10 is (140"−T). In general, the device has a net concentration ratio, wherein the length of the secondary reflector 60 and the length of the primary reflector 10 are such that the net concentration ratio is between 3 and 7.

FIG. 22 shows a spot diagram for the split primary and secondary of the previous embodiment. This split configuration lacks the lacunas 110 or 120, but as shown in FIG. 22, the resulting beam still has a uniform distribution not greatly different from the region around the lacuna 110 of the unsplit version.

A Method for Constructing a Truncated Mersenne System Producing a Circular Beam Using Troughs The embodiments of the present invention also include a method for constructing an optical concentration and collimation system using truncated troughs, comprising:

A. an elliptical primary reflector 10 having a length and width and a plane of symmetry and a longitudinal axis 30 with a center point 40;
B. a circular secondary reflector 60 having a diameter and a plane of symmetry;
C. arranging said elliptical primary and circular secondary reflectors in a Cassegrainian configuration;
D. approximating an elliptical shadow in a beam reflected off the secondary reflector, caused by a shadow of the secondary reflector 60 on the primary reflector, by a rectangle 130 of length D equal to the diameter of the secondary reflector, the shadow having a length and a width, the rectangle having a width T equal to the width of the center of the shadow;
E. splitting the secondary reflector 60 along its plane of symmetry into two halves 60A,B, removing a rectangle 130 of length D and width T/2 from each side of the plane of symmetry, and rejoining the two halves 60A,B; and
F. splitting the primary reflector 10 along its plane of symmetry into two halves 10A,B, removing a rectangle 130 of length D and width T/2 from each side of the plane of symmetry, and rejoining the two halves 10A,B, and providing a truncated circular hole 14B in the primary reflector 10 centered about the vertex point OP and having a size and shape equal to those of the of the truncated secondary reflector's profile.

A Method for Constructing a Truncated Mersenne System Producing a Square Beam Using Troughs The embodiments of the present invention also include a method for constructing an optical concentration and collimation system using truncated troughs, comprising:

A. a rectangular profile primary reflector 10 having a length and a plane of symmetry and a longitudinal axis 30 with a center point 40;
B. a square profile secondary reflector 60 such profile having four sides and a plane of symmetry and a transverse axis 70 with a center point 90 OS;
C. arranging said rectangular primary and square secondary reflectors in a Cassegrainian configuration;
D. approximating a rectangular shadow in a beam reflected off the secondary reflector, caused by a shadow of the secondary reflector 60 on the primary reflector, by a rectangle 130 of length D equal to the length of the side of the secondary reflector, the shadow having a length and a width, the rectangle having a width T equal to the width of the shadow;
E. splitting the secondary reflector 60 along its plane of symmetry into two halves 60A,B, removing a rectangle 130 of length D and width T/2 from each side of the plane of symmetry, and rejoining the two halves 60A,B; and
F. splitting the primary reflector 10 along its plane of symmetry into two halves 10A,B, removing a rectangle 130 of length D and width T/2 from each side of the plane of symmetry, and rejoining the two halves 10A,B, then providing a square hole 14B in primary reflector 10 centered about vertex OP having sides with lengths equal to those of the truncated secondary reflector's profile.

A Method for Constructing Another Truncated Mersenne System Using Troughs

The embodiments of the present invention also include a method for constructing an optical concentration and collimation system using truncated troughs, comprising:

A. providing an elliptical primary reflector 10 having a width and a plane of symmetry and a longitudinal axis 30 with a vertex OP;

B. providing a secondary reflector 60 with a square profile having four sides and a plane of symmetry and a transverse axis 70 with a center point OS;

C. arranging said elliptical primary 10 and square secondary 60 reflectors in a Cassegrainian configuration;

D. approximating an rectangular shadow in a beam reflected off the secondary reflector 60, caused by a shadow of the square secondary reflector 60 on the primary reflector, by a rectangle 130 of length D equal to the width of the secondary reflector, the shadow having a length and a width, the shadow rectangle having a width T equal to the width of the shadow;

E. splitting the secondary reflector 60 along its plane of symmetry into two halves 60A,B, removing a rectangle 130 of length D and width T/2 from each side of the plane of symmetry, and rejoining the two halves 60A,B; and F. splitting the primary reflector 10 along its plane of symmetry into two halves 10A,B, removing a rectangle 130 of length D and width T/2 from each side of the plane of symmetry, and rejoining the two halves 10A,B, and providing a square hole 14B in the primary reflector 10 centered about vertex OP having sides with lengths equal to those of the truncated secondary reflector's profile.

Some advantages of the embodiments of the apparatus were previously enumerated in the Summary section. Every advantageous feature does not need to be incorporated into every embodiment of the apparatus and/or methods.

Although these versions of the invention have been described in considerable detail, other versions are possible. For example, a "one-winged" trough or other asymmetric versions are possible, wherein one half of the primary 10 and a corresponding half of the secondary reflector 60 are removed, as is a configuration using a rectangular profile primary reflector 10 and a circular profile secondary reflector 60, as well as various other shaped primary and secondary surfaces such as a trapezoid and other configurations that may approximate the elliptical profile previously described or produce a collimated beam of whatever shape best matches the intended use of that beam. The secondary reflector 60 could be made from a solid block with the desired trough profile carved into it. Therefore, the spirit and scope of the appended claims should not be limited to the description of the specific versions contained herein.

We claim:

1. An optical concentration and collimation system, comprising:

A. a concave parabolic trough as a primary reflector, the primary reflector having a perimeter and a surface with a center, the primary reflector having a longitudinal axis and two ends and longitudinal tips at each end wherein the longitudinal axis passes through the longitudinal tips, the primary reflector having a length LP as measured along the longitudinal axis between the two tips wherein the longitudinal axis has a center point and the primary reflector has a vertex OP, being the center of the surface of the primary reflector, the primary reflector having an optical axis perpendicular to the longitudinal axis and passing through the vertex OP, the primary reflector having a transverse axis perpendicular to the longitudinal axis and passing through the vertex point OP, the primary reflector having a focal line toward which rays parallel to the optical axis incident on the primary reflector, following reflection from the primary reflector, converge, which focal line of the primary reflector is perpendicular to the optical axis and the longitudinal axis but parallel to the transverse axis, the primary reflector having a focal length, the focal length being a distance along the optical axis from the primary reflector transverse axis to the primary reflector focal line, the primary reflector's optical axis extending through the vertex OP and the longitudinal axis center point and perpendicular to both the longitudinal axis and the transverse axis, the primary reflector having a plane of symmetry that is perpendicular to the longitudinal axis and that extends through the vertex OP and the longitudinal axis center point, the primary reflector having a profile being a projection of the perimeter onto a plane perpendicular to the optical axis forming the shape of an ellipse with a semi-minor axis, and the primary reflector having a width WP that is twice the semi-minor axis of the ellipse of its profile and the primary reflector's length LP is twice the semi-major axis of its profile ellipse;

B. a convex parabolic trough as a secondary reflector, the secondary reflector having a surface with a center, the secondary reflector having a perimeter and a profile, the secondary reflector having a transverse axis perpendicular to the longitudinal axis of the primary reflector and contained within the surface of the secondary reflector, the secondary reflector having a width WS as measured perpendicular to the primary reflectors longitudinal axis and having a center point or vertex OS, the secondary reflector having a focal length and an optical axis, the latter being an extension of the optical axis of the primary reflector through the vertex OS of the secondary reflector, the secondary vertex being at an intersection of the secondary reflectors optical axis with the secondary reflectors surface, the secondary reflector profile being a projection of the perimeter parallel to the optical axis onto a plane perpendicular to the optical axis, the secondary reflector having a focal line from which parallel rays parallel to the optical axis incident on the secondary reflector, following reflection, diverge, which focal line of the secondary reflector is perpendicular to the optical axis but parallel to the transverse axis of the secondary reflector, the secondary reflector having a focal length, the focal length of the secondary reflector being a distance along the optical axis from the secondary reflector vertex OS to the secondary reflector focal line, the secondary vertex being spaced from the primary vertex so as to place the focal lines of the primary and secondary reflectors into coincidence, the secondary reflector having a plane of symmetry perpendicular to the longitudinal axis and containing both the optical axis and the transverse axis of the secondary reflector, the secondary reflector profile being circular and having a diameter with a radius approximately equal to half the width of the primary reflector, wherein the longitudinal length of the primary reflector is at least greater than the diameter of the profile of the secondary reflector; and C. said primary and secondary reflectors arranged in a Mersenne-like Cassegrainian configuration, the primary reflector having a hole centered on the reflectors vertex OP, the hole having a perimeter, a projection of that hole's perimeter onto a plane perpendicular to the optical axis being circular with a diameter equal to or larger than the secondary reflectors profile, to allow a beam reflected from the secondary mirror to pass through it.

2. The device of claim 1, wherein the diameter of the secondary reflector is 23", the width of the primary reflector is 23", and the length of the primary reflector is 160".

3. The device of claim 1, wherein the diameter of the secondary reflector is 29" and the length of the primary reflector is 140".

4. The device of claim 1, the device having a net concentration ratio, wherein the diameter of the secondary reflector and the length of the primary reflector are such that the net concentration ratio is between 3 and 7.

* * * * *